United States Patent [19]
Takizawa et al.

[11] Patent Number: 5,990,227
[45] Date of Patent: Nov. 23, 1999

[54] INK SET

[75] Inventors: Yoshihisa Takizawa, Kawasaki; Makoto Aoki; Yutaka Kurabayashi, both of Yokohama, all of Japan

[73] Assignee: Canon Kabushiki Kaisha, Tokyo, Japan

[21] Appl. No.: 08/801,368

[22] Filed: Feb. 19, 1997

Related U.S. Application Data

[62] Division of application No. 08/092,219, Jul. 16, 1993, Pat. No. 5,623,294.

[30] Foreign Application Priority Data

| Jul. 17, 1992 | [JP] | Japan | 4-190947 |
| Sep. 1, 1992 | [JP] | Japan | 4-233693 |
| Dec. 28, 1992 | [JP] | Japan | 4-348639 |

[51] Int. Cl.[6] ................................ C08L 37/00
[52] U.S. Cl. ................... 524/517; 524/9; 524/18; 524/25; 524/26; 524/27; 524/28; 524/35; 524/47; 524/52; 524/53; 524/377; 524/498; 524/500; 524/502; 524/516; 524/522; 524/521; 524/77; 524/78; 106/31.4; 106/31.41; 106/31.36; 106/31.37; 106/31.39
[58] Field of Search ................ 524/366, 27, 77, 524/78, 9, 18, 25, 26, 28, 35, 47, 52, 53, 377, 498, 500, 502, 516, 522, 521, 517; 106/31.41, 31.4, 31.36, 31.37, 31.39

[56] References Cited

U.S. PATENT DOCUMENTS

| 4,533,920 | 8/1985 | Suzuki | 364/1.1 |
| 5,078,790 | 1/1992 | Tochihara et al. | 106/20 |
| 5,080,716 | 1/1992 | Aoki et al. | 106/20 |
| 5,124,201 | 6/1992 | Kurabayashi et al. | 428/323 |
| 5,131,949 | 7/1992 | Tochihara et al. | 106/20 |
| 5,132,700 | 7/1992 | Tochihara et al. | 346/1.1 |
| 5,172,133 | 12/1992 | Suga et al. | 342/100 |
| 5,181,045 | 1/1993 | Shields et al. | 346/1.1 |
| 5,246,774 | 9/1993 | Sakaki et al. | 428/323 |
| 5,380,358 | 1/1995 | Aoki et al. | 106/20 R |
| 5,427,611 | 6/1995 | Shirota et al. | 106/22 A |
| 5,607,999 | 3/1997 | Shimizu et al. | 524/503 |
| 5,621,447 | 4/1997 | Takizawa et al. | 347/88 |

FOREIGN PATENT DOCUMENTS

| 0 015 704 A1 | 9/1980 | European Pat. Off. . |
| 0 472 169 A2 | 2/1992 | European Pat. Off. . |
| 0 540 757 A1 | 5/1993 | European Pat. Off. . |
| 61-59911 | 5/1979 | Japan . |
| 61-59912 | 5/1979 | Japan . |
| 61-59914 | 2/1980 | Japan . |
| 55-65269 | 5/1980 | Japan . |
| 55-66976 | 5/1980 | Japan . |
| 64-9279 | 1/1989 | Japan . |
| 64-63185 | 3/1989 | Japan . |

*Primary Examiner*—Judy M. Reddick
*Attorney, Agent, or Firm*—Fitzpatrick, Cella, Harper & Scinto

[57] ABSTRACT

Disclosed herein is an ink-jet recording process which comprises applying a first liquid at least containing a water-soluble resin having at least one carboxyl group or anhydride thereof, or sulfonic group per molecule to a recording medium and then applying an ink at least comprising water, an organic solvent, a dye, an alkali-soluble resin and an alkali to the portions where the first liquid has adhered, thereby forming an image. An ink set and an instrument for use in such a process are also disclosed.

6 Claims, 5 Drawing Sheets

INK SET

This application is a division of application Ser. No. 08/092,219 filed Jul. 16, 1993 now U.S. Pat. No. 5,623,294.

BACKGROUND OF THE INVENTION

1. Field of the Invention

The present invention relates to ink-jet recording. More specifically, the present invention relates to an ink set, an ink-jet recording process and a recording apparatus, by which high-quality color images can be formed on plain paper.

2. Related Background Art

Ink-jet recording is a method in which recording is conducted by ejecting droplets of an ink and then applying the droplets to a recording material such as paper. In particular, according to the methods disclosed in Japanese Patent Publication Nos. 61-59911, 61-59912 and 61-59914 by the present applicant, in which an electrothermal converter is used as an ejection-energy supply means to apply thermal energy to an ink so as to generate bubbles, thereby ejecting droplets of the ink, formation of a high-density multi-orifice head can be realized with ease, and high-resolution and high-quality images can be recorded at high speed.

However, the conventional inks used in ink-jet recording generally comprise, as a principal component, water, and include additionally a water-soluble high boiling solvent such as glycol for the purpose of preventing drying and clogging, and the like. When such an ink has been used to conduct recording on plain paper, there have been disadvantages that the ink penetrates into the interior of the recording paper, resulting in failure to achieve sufficient image density, and moreover, unevenness of image density occurs, which appears to be attributed to the uneven distribution of the filler and size on the surface of the recording paper. In particular, when color images are intended to form, a plurality of inks of different colors are overlapped one after another before they are fixed. Therefore, color bleeding and uneven color mixing have occurred at portions of boundaries between images of different colors (hereinafter referred to as "bleeding" simply), resulting in failure to obtain satisfactory images.

As means for solving the above-described problems, Japanese Patent Application Laid-Open No. 55-65269 discloses the use of inks comprising a compound capable of enhancing their penetrability, such as a surfactant, and Japanese Patent Application Laid-Open No. 55-66976 discloses the use of inks comprising, as a principal component, a volatile solvent. However, the former method has involved a disadvantage that although the penetrability of the inks into recording paper is improved, and the bleeding can be prevented to some extent, the image density and the brightness of images are lowered because the inks penetrate deeply in the recording paper together with coloring matter. In addition, since the wettability to the surface of the recording paper is also improved, the inks tend to spread, resulting in reduction of resolution and occurrence of feathering. Therefore, such a method has not been preferred. In particular, this problem is noticeable when black-colored characters are expressed. On the other hand, the latter method is liable to cause clogging due to the evaporation of the solvent in a nozzle of a recording head in addition to the above-described disadvantages. Such a method has therefore not been preferred.

Further, there have been disclosed methods of applying a liquid, which can make the quality of images better, to recording paper prior to the jetting of a recording ink. Japanese Patent Application Laid-Open No. 63-29971 discloses a method in which a liquid containing an organic compound having two or more cationic groups per molecule is applied to recording paper, and recording is then conducted with an ink containing an anionic dye. Japanese Patent Application Laid-Open No. 64-9279 discloses a method in which an acidic liquid containing succinic acid or the like is applied to recording paper, and recording is then conducted with an ink. Japanese Patent Application Laid-Open No. 64-63185 discloses a method of applying a liquid, which insolubilizes dyes, to recording paper prior to recording. All these methods intend to improve the fixability, waterproofness and the like of images recorded owing to the deposition of the dye itself in the ink. Although all these methods have been able to prevent bleeding to some extent, they have been poor in coverability on paper fibers in the recording paper because the dye is deposited unevenly on the recording paper, resulting in an image in which white voids are conspicuous. In addition, the rub-off resistance of the image formed has also been poor. Therefore, the image has come off when rubbed with a finger, and the recording paper has been smeared. Accordingly, these methods have not been preferred.

SUMMARY OF THE INVENTION

The present invention has been completed with the foregoing circumstances in view and has as a first object the provision of an ink set, a color ink-jet recording process and a recording apparatus, which can achieve sufficient image density even in recording on plain paper, and make it possible to conduct recording high in image quality in which evenness of image density is high and in particular, bleeding in a color image is prevented.

A second object of the present invention is to provide an ink set, a color ink-jet recording process and a recording apparatus, by which the quality of black-colored characters, which tends to decrease in color recording compared to monochrome recording, becomes good.

A third object of the present invention is to provide an ink set, a color ink-jet recording process and a recording apparatus, by which the rub-off resistance of an image formed becomes good.

More specifically, the first object can be achieved by an ink-jet recording process, which comprises applying a first liquid at least containing a water-soluble resin having at least one carboxyl group or anhydride thereof, or sulfonic group per molecule to a recording medium and then applying an ink at least comprising water, an organic solvent, a dye, an alkali-soluble resin and an alkali to the portions where the first liquid has been applied, thereby forming an image, and an ink set and an instrument for use in such a process.

The second object can be achieved by an ink-jet recording process, which comprises at least using yellow, magenta and cyan inks and ejecting the inks onto a recording material to record a color image on the recording material, wherein the inks of different colors are different in pH from one another, and when at least two inks of the different colors are mixed, at least part of the compositions of the inks mixed deposits, or the viscosity of at least one ink increases, and an ink set and an instrument for use in such a process.

The third object can be achieved by an ink-jet recording process, which comprises at least using yellow, magenta, cyan and black inks and ejecting out the inks on a recording material to record a color image on the recording material, wherein the yellow, magenta and cyan inks each contain a penetrability-imparting surfactant or a penetrable solvent, the black ink is different in pH from the yellow, magenta and cyan inks, and when the black ink is mixed with at least one of the yellow, magenta and cyan inks, at least a part of the compositions of the inks mixed deposits, or the viscosity of at least one ink increases, and an ink set and an instrument for use in such a process.

In the first aspect of the present invention, there is thus provided an ink-jet recording process which comprises applying a first liquid at least containing a water-soluble resin having at least one carboxyl group or anhydride thereof, or sulfonic group in unit molecule to a recording medium and then applying an ink at least comprising water, an organic solvent, a dye, an alkali-soluble resin and an alkali to the portions where the first liquid has been applied, thereby forming an image.

In the second aspect of the present invention, there is provided a color ink-jet recording process comprising ejecting droplets of at least two inks of different colors in such a manner that the respective droplets adjoin or overlap on a recording medium, thereby making a record, wherein a first liquid at least containing a water-soluble resin having at least one carboxyl group or anhydride thereof, or sulfonic group per molecule is applied to the recording medium and at least two inks selected from the group consisting of yellow, magenta, cyan and black inks which each at least comprise water, an organic solvent, a dye, an alkali-soluble resin and an alkali are then applied to the portions where the first liquid has been applied, thereby forming an image.

In the third aspect of the present invention, there is provided an ink set for ink-jet recording, comprising the following first liquid and ink:
(1) the first liquid at least containing a water-soluble resin having at least one carboxyl group or anhydride thereof, or sulfonic group per molecule; and
(2) the ink at least comprising water, an organic solvent, a dye, an alkali-soluble resin and an alkali.

In the fourth aspect of the present invention, there is provided an ink set for ink-jet recording, comprising the following first liquid and inks:
(1) the first liquid at least containing a water-soluble resin having at least one carboxyl group or anhydride thereof, or sulfonic group per molecule; and
(2) the inks including yellow, magenta and cyan inks which each at least comprise water, an organic solvent, a dye, an alkali-soluble resin and an alkali.

In the fifth aspect of the present invention, there is provided an ink set for ink-jet recording, comprising the following first liquid and inks:
(1) the first liquid at least containing a water-soluble resin having at least one carboxyl group or anhydride thereof, or sulfonic group per molecule; and
(2) the inks including yellow, magenta, cyan and black inks which each at least comprise water, an organic solvent, a dye, an alkali-soluble resin and an alkali.

In the sixth aspect of the present invention, there is provided an ink-jet recording unit equipped with container parts separately containing the first liquid and inks in the ink set for ink-jet recording according to any one of the third to fifth aspects therein and heads for separately ejecting the first liquid and the inks as their droplets.

In the seventh aspect of the present invention, there is provided an ink cartridge for ink-jet recording, which is equipped with container parts separately containing the first liquid and inks in the ink set for ink-jet recording according to any one of the third to fifth aspects therein.

In the eighth aspect of the present invention, there is provided an ink-jet recording apparatus comprising the ink-jet recording unit according to the sixth aspect.

In the ninth aspect of the present invention, there is provided an ink-jet recording apparatus comprising the ink cartridge for ink-jet recording according to the seventh aspect.

In the tenth aspect of the present invention, there is provided an ink-jet recording process comprising at least using yellow, magenta and cyan inks and ejecting the inks onto a recording material to record a color image on the recording material, wherein the inks of different colors are different in pH from one another, and when at least two inks of the different colors are mixed, at least a part of the compositions of the inks mixed deposits, or the viscosity of at least one ink increases.

In the eleventh aspect of the present invention, there is provided an ink-jet recording process comprising using yellow, magenta and cyan inks and ejecting the inks onto a recording material to record a color image on the recording material, wherein the inks completely satisfy the following conditions:
(1) an ink (referred to as "the first ink") selected from the yellow, magenta and cyan inks contains a water-soluble resin having at least one carboxyl group or anhydride thereof, or sulfonic group per molecule, and the pH (referred to as "$ph_1$") of the first ink ranges from 1 to 7;
(2) another ink (referred to as "the second ink") selected from the yellow, magenta and cyan inks contains a water-soluble resin having at least one carboxyl group or anhydride thereof, or sulfonic group in unit molecule, or an alkali-soluble resin, and the pH (referred to as "$pH_2$") of the second ink ranges from 5 to 9;
(3) a further ink (referred to as "the third ink") selected from the yellow, magenta and cyan inks contains an alkali-soluble resin, and the pH (referred to as "$pH_3$") of the third ink ranges from 8 to 12; and
(4) the pHs of the first, second and third inks satisfy the relationship of $pH_1 < pH_2 < pH_3$.

In the twelfth aspect of the present invention, there is provided an ink-jet recording process comprising at least using yellow, magenta, cyan and black inks and ejecting the inks on a recording material to record a color image onto the recording material, wherein the inks of different colors are different in pH from one another, and when at least two inks of the different colors are mixed, at least a part of the compositions of the inks mixed deposits, or the viscosity of at least one ink increases.

In the thirteenth aspect of the present invention, there is provided an ink-jet recording process comprising using yellow, magenta, cyan and black inks and ejecting the inks on a recording material to record a color image onto the recording material, wherein the inks completely satisfy the following conditions:
(1) an ink (referred to as "the first ink") selected from the yellow, magenta, cyan and black inks contains a water-soluble resin having at least one carboxyl group or anhydride thereof, or sulfonic group per molecule, and the pH (referred to as "$pH_1$") of the first ink ranges from 1 to 6;
(2) another ink (referred to as "the second ink") selected from the yellow, magenta, cyan and black inks contains a water-soluble resin having at least one carboxyl group or anhydride thereof, or sulfonic group per molecule, or an alkali-soluble resin, and the pH (referred to as "$pH_2$") of the second ink ranges from 4 to 8;

(3) a further ink (referred to as "the third ink") selected from the yellow, magenta, cyan and black inks contains an alkali-soluble resin, and the pH (referred to as "$pH_3$") of the third ink ranges from 6 to 10;

(4) a still further ink (referred to as "the fourth ink") selected from the yellow, magenta, cyan and black inks contains an alkali-soluble resin, and the pH (referred to as "$pH_4$") of the fourth ink ranges from 8 to 13; and (5) the pHs of the first, second, third and fourth inks satisfy the relationship of $pH_1 < pH_2 < pH_3 < pH_4$.

In the fourteenth aspect of the present invention, there is provided an ink set for ink-jet recording, at least comprising yellow, magenta and cyan inks, wherein the inks of different colors are different in pH from one another, and when at least two inks of the different colors are mixed, at least a part of the compositions of the inks mixed deposits, or the viscosity of at least one ink increases.

In the fifteenth aspect of the present invention, there is provided an ink set for ink-jet recording, comprising yellow, magenta and cyan inks, wherein the inks completely satisfy the following conditions:

(1) an ink (referred to as "the first ink") selected from the yellow, magenta and cyan inks contains a water-soluble resin having at least one carboxyl group or anhydride thereof, or sulfonic group per molecule, and the pH (referred to as "$pH_1$") of the first ink ranges from 1 to 7;

(2) another ink (referred to as "the second ink") selected from the yellow, magenta and cyan inks contains a water-soluble resin having at least one carboxyl group or anhydride thereof, or sulfonic group per molecule, or an alkali-soluble resin, and the pH (referred to as "$pH_2$") of the second ink ranges from 5 to 9;

(3) a further ink (referred to as "the third ink") selected from the yellow, magenta and cyan inks contains an alkali-soluble resin, and the pH (referred to as "$pH_3$") of the third ink ranges from 8 to 12; and (4) the pHs of the first, second and third inks satisfy the relationship of $pH_1 < pH_2 < pH_3$.

In the sixteenth aspect of the present invention, there is provided an ink set for ink-jet recording, at least comprising yellow, magenta, cyan and black inks, wherein the inks of different colors are different in pH from one another, and when at least two inks of the different colors are mixed, at least a part of the compositions of the inks mixed deposits, or the viscosity of at least one ink increases.

In the seventeenth aspect of the present invention, there is provided an ink set for ink-jet recording, comprising yellow, magenta, cyan and black inks, wherein the inks completely satisfy the following conditions:

(1) an ink (referred to as "the first ink") selected from the yellow, magenta, cyan and black inks contains a water-soluble resin having at least one carboxyl group or anhydride thereof, or sulfonic group per molecule, and the pH (referred to as "$pH_1$") of the first ink ranges from 1 to 6;

(2) another ink (referred to as "the second ink") selected from the yellow, magenta, cyan and black inks contains a water-soluble resin having at least one carboxyl group or anhydride thereof, or sulfonic group per molecule, or an alkali-soluble resin, and the pH (referred to as "$pH_2$") of the second ink ranges from 4 to 8;

(3) a further ink (referred to as "the third ink") selected from the yellow, magenta, cyan and black inks contains an alkali-soluble resin, and the pH (referred to as "$pH_3$") of the third ink ranges from 6 to 10;

(4) a still further ink (referred to as "the fourth ink") selected from the yellow, magenta, cyan and black inks contains an alkali-soluble resin, and the pH (referred to as "$pH_4$") of the fourth ink ranges from 8 to 13; and (5) the pHs of the first, second, third and fourth inks satisfy the relationship of $pH_1 < pH_2 < pH_3 < pH_4$.

In the eighteenth aspect of the present invention, there is provided an ink-jet recording unit equipped with container parts separately containing the inks in the ink set for ink-jet recording according to any one of the fourteenth to seventeenth aspects therein and heads for separately ejecting the inks as their droplets.

In the nineteenth aspect of the present invention, there is provided an ink cartridge for ink-jet recording, which is equipped with container parts separately containing the inks in the ink set for ink-jet recording according to any one of the fourteenth to seventeenth aspects.

In the twentieth aspect of the present invention, there is provided an ink-jet recording apparatus comprising an ink-jet recording unit which has container parts separately containing the inks in the ink set for ink-jet recording according to any one of the fourteenth to seventeenth aspects therein and heads for separately ejecting the inks as their droplets.

In the twenty-first aspect of the present invention, there is provided an ink-jet recording apparatus comprising the ink cartridge for ink-jet recording according to the nineteenth aspect.

In the twenty-second aspect of the present invention, there is provided an ink-jet recording apparatus comprising the ink set according to any one of the fourteenth to seventeenth aspects.

In the twenty-third aspect of the present invention, there is provided an ink-jet recording process comprising at least using yellow, magenta, cyan and black inks and ejecting out the inks on a recording material to record a color image on the recording material, wherein the yellow, magenta and cyan inks each contain a penetrability-imparting surfactant or a penetrable solvent, the black ink is different in pH from the yellow, magenta and cyan inks, and when the black ink is mixed with at least one of the yellow, magenta and cyan inks, at least a part of the compositions of the inks mixed deposits, or the viscosity of at least one ink increases.

In the twenty-fourth aspect of the present invention, there is provided an ink-jet recording process comprising using yellow, magenta, cyan and black inks and ejecting the inks on a recording material to record a color image on the recording material, wherein the inks completely satisfy the following conditions:

(1) the yellow, magenta and cyan inks each contain at least one of a penetrability-imparting surfactant and a penetrable solvent, and a water-soluble resin;

(2) the black ink contains an alkali-soluble resin; and (3) the pHs of the yellow, magenta and cyan inks are lower than that of the black ink.

In the twenty-fifth aspect of the present invention, there is provided an ink-jet recording process comprising using yellow, magenta, cyan and black inks and ejecting the inks on a recording material to record a color image on the recording material, wherein the inks completely satisfy the following conditions:

(1) the yellow, magenta and cyan inks each contain at least one of a penetrability-imparting surfactant and a penetrable solvent, and an alkali-soluble resin;

(2) the black ink contains a water-soluble resin; and (3) the pHs of the yellow, magenta and cyan inks are higher than that of the black ink.

In the twenty-sixth aspect of the present invention, there is provided an ink set for ink-jet recording, at least comprising yellow, magenta, cyan and black inks, wherein the yellow, magenta and cyan inks each contain a penetrability-imparting surfactant or a penetrable solvent, the black ink is different in pH from the yellow, magenta and cyan inks, and when the black ink is mixed with at least one of the yellow, magenta and cyan inks, at least a part of the compositions of the inks mixed deposits, or the viscosity of at least one ink increases.

In the twenty-seventh aspect of the present invention, there is provided an ink set for ink-jet recording, comprising yellow, magenta, cyan and black inks, wherein the inks completely satisfy the following conditions:

(1) the yellow, magenta and cyan inks each contain at least one of a penetrability-imparting surfactant and a penetrable solvent, and a water-soluble resin;

(2) the black ink contains an alkali-soluble resin; and (3) the pHs of the yellow, magenta and cyan inks are lower than that of the black ink.

In the twenty-eighth aspect of the present invention, there is provided an ink set for ink-jet recording, comprising yellow, magenta, cyan and black inks, wherein the inks completely satisfy the following conditions:

(1) the yellow, magenta and cyan inks each contain at least one of a penetrability-imparting surfactant and a penetrable solvent, and an alkali-soluble resin;

(2) the black ink contains a water-soluble resin; and (3) the pHs of the yellow, magenta and cyan inks are higher than that of the black ink.

In the twenty-ninth aspect of the present invention, there is provided an ink-jet recording unit equipped with container parts separately containing the inks in the ink set for ink-jet recording according to any one of the twenty-sixth to twenty-eighth aspects therein and heads for separately ejecting the inks as their droplets.

In the thirtieth aspect of the present invention, there is provided an ink cartridge for ink-jet recording, which is equipped with container parts separately containing the inks in the ink set for ink-jet recording according to any one of the twenty-sixth to twenty-eighth aspects therein.

In the thirty-first aspect of the present invention, there is provided an ink-jet recording apparatus comprising an ink-jet recording unit which has container parts separately containing the inks in the ink set for ink-jet recording according to any one of the twenty-sixth to twenty-eighth aspects therein and heads for separately ejecting the inks as their droplets.

In the thirty-second aspect of the present invention, there is provided an ink-jet recording apparatus comprising the ink cartridge for ink-jet recording according to the thirtieth aspect.

In the thirty-third aspect of the present invention, there is provided an ink-jet recording apparatus comprising the ink set according to any one of the twenty-sixth to twenty-eighth aspects.

DESCRIPTION OF THE PREFERRED EMBODIMENTS

Figure 1:
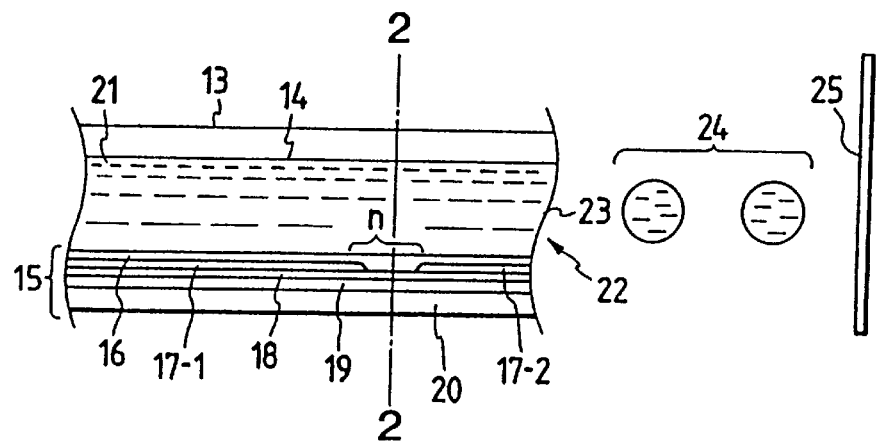
FIG. 1 is a longitudinal cross-sectional view of a head of an ink-jet recording apparatus.

The present invention is composed of the above-described three aspects.

First of all, the first aspect of the present invention will hereinafter be described in detail.

The present inventors have found that when a first colorless liquid at least containing a water-soluble resin having at least one carboxyl group or anhydride thereof, or sulfonic group per molecule is applied to plain paper prior to the application of an ink to the plain paper, and the ink at least comprising water, an organic solvent, a dye, an alkali-soluble resin and an alkali is then applied to the portions where the first liquid has been applied, a record image which fulfills the above objects can be obtained, leading to the completion of the first aspect of the present invention.

This principle is considered to be as follows. Namely, when the water-soluble resin having at least one carboxyl group or anhydride thereof, or sulfonic group per molecule is dissolved in water or the like, the resin is in a hydrated state that water is adsorbed on the electrically polarized portion of the carboxyl or sulfonic group. When the alkali contained in the ink comes into contact with this on the recording paper, the carboxyl or sulfonic group forms a salt to ionize. At this time, the resin molecule extends in the form of a thread owing to electrical repulsion, so that the viscosity of the liquid increases. On the other hand, the pH of the alkali-soluble resin contained in the ink is lowered when coming into contact with the first liquid on the recording paper because the first liquid is acid or weakly acid, so that the deposition of the resin occurs. The dye in the ink is fixed in the vicinity of the surface of the recording paper owing to both effects of the viscosity increase of the first liquid and the deposition of the alkali-soluble resin in the ink. It is therefore believed that sufficient image density is achieved, and a high-quality image, in which evenness of image density is high, bleeding in a color image is prevented, image density is high, the image is bright and even, and its rub-off resistance is also good, can be provided.

In the ink-jet recording process according to the first aspect of the present invention, as described above, the first colorless liquid at least containing a water-soluble resin having at least one carboxyl group or anhydride thereof, or sulfonic group in unit molecule is first applied to the recording paper.

As the water-soluble resin, there is used a naturally-occurring water-soluble polymer or a synthetic water-soluble resin, which has at least one carboxyl group or anhydride thereof, or sulfonic group per molecule. More specifically, a naturally-occurring water-soluble polymer such as alginic acid, carboxymethyl cellulose, pectinic acid or carboxymethylated starch, or a synthetic water-soluble resin such as a polymer obtained by using, as a monomer, at least one of acrylic acid, methacrylic acid, itaconic acid, maleic acid and maleic anhydride, or a copolymer of the above-described monomer and a hydrophilic monomer having a hydrophilic group such as a hydroxyl, amide, amino, ether, pyrrolidone or ethylenimine group in its molecule is used. Examples of the resin preferably used include homopolymers such as polyacrylic acid, polymethacrylic acid, polyitaconic acid and polymaleic acid; copolymer resins of carboxyl group-containing monomers, such as acrylic acid-itaconic acid copolymer resins and acrylic acid-methacrylic acid copolymer resins; and copolymer resins of a carboxyl group-containing monomer and a hydrophilic group-containing monomer, such as methyl vinyl ether-maleic anhydride copolymer resins, methyl vinyl ether-maleic anhydride alkyl monoester copolymer resins and acrylic acid-N-vinyl-pyrrolidone copolymer resins.

No particular limitation is imposed on other physical properties of the water-soluble resin. However, it may preferably have a weight average molecular weight ranging from 1,000 to 500,000. If its molecular weight is not lower than 1,000, the desired viscosity-increasing effect is lessened. If the molecular weight exceeds 500,000, the initial viscosity of the first liquid is increased, so that the jetting property of the first liquid is lowered. Therefore, it is not very preferable to use any resins having such a low or high molecular weight. The resin may preferably have an acid value of 200 or higher. Any acid values lower than 200 are not preferred in some cases because the solubility of the resin in water becomes somewhat insufficient. The amount of the water-soluble resin to be added to the first liquid may preferably be within a range of from 0.05 to 30% by weight. If the amount is less than 0.05% by weight, the desired effect is lessened. If the amount exceeds 30% by weight, the initial viscosity of the first liquid is increased. It is not hence preferable to use the water-soluble resin in such a little or great amount.

The first liquid is prepared by mixing, generally, water and optionally, a water-soluble organic solvent in addition to the water-soluble resin. Examples of the water-soluble solvent used include amides such as dimethylformamide and dimethylacetoamide, ketones such as acetone, ethers such as tetrahydrofuran and dioxane, polyalkylene glycols such as polyethylene glycol and polypropylene glycol, alkylene glycols such as ethylene glycol, propylene glycol, butylene glycol, triethylene glycol, thiodiglycol, hexylene glycol and diethylene glycol, lower alkyl ethers of polyhydric alcohols such as ethylene glycol methyl ether, diethylene glycol monomethyl ether and triethylene glycol monomethyl ether, monohydric alcohols such as ethanol and isopropyl alcohol, and besides, glycerol, 1,2,6-hexanetriol, N-methyl-2-pyrrolidone, 1,3-dimethyl-2-imidazolidinone, triethanolamine, sulfolane and dimethyl sulfoxide. No particular limitation is imposed on the content of the water-soluble organic solvent. However, it may preferably be within a range of from 1 to 80% by weight.

In addition to the above components, the first liquid may contain additives such as viscosity modifiers, pH adjustors, mildewproofing agents, surfactants, antioxidants and evaporation accelerators, as needed.

As another physical property of the first liquid, its pH may preferably be within a range of from 1 to 7. If the pH is lower than 1, the material of a recording head through which the first liquid is jetted out may be deteriorated in some cases. If the pH exceeds 7, the desired effect is lessened. It is not hence preferable to keep the pH outside the above range.

The first liquid may preferably be colorless and transparent. However, it may have a pale color so long as it does not change the color tone of the recording ink. However, this pale color is indicative of the case where the first liquid is not colored positively by a colorant, but colored palely by the resin and solvent to be mixed.

After the first liquid is applied to the recording paper, an ink is then applied, thereby forming an image. The ink at least contains water, an organic solvent, a dye, an alkali-soluble resin and an alkali.

As the alkali-soluble resin, there is preferably used a naturally-occurred alkali-soluble polymer such as casein, zein or pectin, or a copolymer resin of a hydrophilic monomer and a hydrophobic monomer. As the hydrophilic monomer, there is used a monomer containing, as a basic main chain, an acrylic, methacrylic, vinyl, ether, maleic or maleic anhydride group and having, as a side chain, a hydrophilic group such as a sulfonic, carboxylic, hydroxyl, amide, amino, ether or pyrrolidone group. As the hydrophobic monomer, there is preferably used styrene, an acrylic ester, isobutylene or the like. Specific examples of the alkali-soluble resin used include styrene-acrylic acid resins, styrene-acrylic acid-acrylic ester resins, styrene-maleic acid resins, styrene-maleic half ester resins, isobutylene-maleic anhydride resins, rosin-modified maleic acid resins, and besides water-soluble alkyds, water-soluble polyesters and water-soluble polyamides.

No particular limitation is imposed on other physical properties of the alkali-soluble resin. However, it may preferably have a weight average molecular weight ranging from 1,000 to 100,000. If its molecular weight is not lower than 1,000, the desired effect is lessened. If the molecular weight exceeds 100,000, the initial viscosity of the ink is increased, so that the jetting property of the ink is lowered. Therefore, it is not very preferable to use any resins having such a low or high molecular weight. The amount of the alkali-soluble resin to be added to the ink may preferably be within a range of from 0.05 to 30% by weight. If the amount is less than 0.05% by weight, the desired effect is lessened. If the amount exceeds 30% by weight, the initial viscosity of the ink is increased. It is not hence preferable to use the alkali-soluble resin in such a little or great amount.

As the alkali useful in the solubilization of the alkali-soluble resin, there can be used sodium hydroxide, sodium carbonate, ammonium carbonate, ammonia, sodium acetate, ammonium acetate, morpholine, or an alkanolamine such as monoethanolamine, diethanolamine, triethanolamine, ethyl monoethanolamine, normal butyl monoethanolamine, dimethyl ethanolamine, diethyl ethanolamine, ethyl diethanolamine, normal butyl diethanolamine, di-normal-butyl ethanolamine, monoisopropanolamine, diisopropanolamine or triisopropanolamine. The amount of the alkali to be used may preferably be within a range of from 5 to 100% by weight based on the alkali-soluble resin though it varies according to the amount of the alkali-soluble resin used.

As dyes used in the ink, there can be used almost all water-soluble acid dyes, direct dyes, basic dyes and reactive dyes, which are described in COLOR INDEX. Any dyes not described in COLOR INDEX may also be used so long as they are soluble in water. No particular limitation is imposed on the amount of the dye used. However, it may preferably be within a range of from 0.1 to 20% by weight based on the total weight of the ink.

As the organic solvent used in the ink, the organic solvents used in the first liquid may also be used. No particular limitation is imposed on the amount of the organic solvent to be used. However, it may preferably be within a range of from 1 to 80% by weight based on the total weight of the ink.

In addition to the above components, the ink may contain additives such as viscosity modifiers, pH adjustors, mildew-proofing agents, surfactants, antioxidants and evaporation accelerators, as needed.

The recording process according to the first aspect of the present invention comprises using the first liquid and the ink, and first applying the first liquid to recording paper prior to the application of the ink and then applying the ink to the portions where the first liquid has been applied basically without particularly heating or forcedly drying the recording paper, thereby obtaining a record image. In some cases, however, force-drying such as drying under heat may be conducted after the first liquid is applied to the recording paper.

As a method of applying the first liquid to the recording medium, it is considered to apply the first liquid to the whole surface of the recording paper by a sprayer, roller or the like. However, the application is preferably carried out by an ink-jet system by which the first liquid can be applied selectively and evenly only to portions where the ink will be applied subsequently. In the case where the first liquid is applied by the ink-jet system, it is necessary to apply the first liquid in advance to at least portions where the ink is to be applied. No particular limitation is imposed on the sizes of drops of the first liquid and the ink or the diameters of their dots formed on the recording paper. However, when the dot diameter of the first liquid is larger than that of the recording ink, the desired effect is achieved to a greater extent.

No particular limitation is imposed on the time required from the time the first liquid is applied to the recording paper up to the time the ink is then applied.

As the method of applying the first liquid and the ink to the recording paper, various kinds of ink-jet systems may be used. However, a system in which bubbles generated by thermal energy are used to eject droplets is particularly preferred.

The second aspect of the present invention will hereinafter be described in detail.

The present inventors have found that when in a process wherein yellow, magenta and cyan inks are at least used and the inks are ejected on plain paper to record a color image, the three inks are prepared in such a manner that pH is varied with colors of the inks, and when at least two inks of the different colors are mixed, at least a part of the compositions of the inks mixed deposits, or the viscosity of at least one ink increases, a record image which fulfills the above objects can be obtained, leading to the completion of the second aspect of the present invention.

In order to deposit the part of the compositions or to increase the viscosity of the ink when at least two inks of the different colors come into contact with each other, the deposition of the resin or the change in viscosity of the ink by the change in pH of the ink is used. More specifically, for example, an ink with a water-soluble resin having at least one carboxyl group or anhydride thereof, or sulfonic group per molecule dissolved in water or the like is in a hydrated state that water is adsorbed on the electrically polarized portion of the carboxyl or sulfonic group. Now, an alkali-soluble resin and an alkali are contained in another ink having a color different from the above ink in advance. When both inks come into contact with each other on the recording paper, the carboxyl group forms a salt to ionize. At this time, the resin molecule extends in the form of a thread owing to electrical repulsion, so that the viscosity of the first ink increases. On the other hand, the pH of the alkali-soluble resin contained in the second ink is lowered when coming into contact with the first ink on the recording paper, so that the deposition of the resin occurs. The dyes in the inks are fixed in the vicinity of the surface of the recording paper owing to both effects of the viscosity increase and the deposition of the alkali-soluble resin. It is therefore believed that sufficient image density is achieved, and a high-quality image, in which evenness of image density is high, bleeding in a color image is prevented, image density is high, the image is bright and even, and its rub-off resistance is also good, can be provided.

The second aspect of the present invention has been described above as to the case where two inks of different colors are brought into contact with each other on the recording paper. Besides, when recording is conducted with three inks of yellow, magenta and cyan colors, it is only necessary to select the kind of a resin to be added to the individual inks of the different colors and suitably carry out the pH control of the inks so as to achieve the same effects as described above even when any two inks of the different colors come into contact with each other. The same may be said of the case where recording is conducted with an ink of a black color in addition to the three inks of the yellow, magenta and cyan colors.

As described above, any one of the inks used in an ink set according to the second aspect of the present invention first contains a water-soluble resin or an alkali-soluble resin therein. As the water-soluble resin, there is used a naturally-occurring water-soluble polymer or a synthetic water-soluble resin which has at least one carboxyl group or anhydride thereof, or sulfonic group per molecule. A naturally-occurring water-soluble polymer such as alginic acid, carboxymethyl cellulose, pectinic acid or carboxymethylated starch, or a synthetic water-soluble resin synthesized by using at least one polymerizable monomer containing in its molecular unit a vinyl, acrylic, methacrylic, ether or maleic anhydride group, or the like may preferably be used.

More preferable examples of the synthetic water-soluble resin used in the inks include synthetic water-soluble resins such as polymers obtained by using, as a monomer, at least one of acrylic acid, methacrylic acid, itaconic acid, maleic acid and maleic anhydride, and copolymers of the above-described monomer and a hydrophilic monomer having a hydrophilic group such as a hydroxyl, amide, amino, ether, pyrrolidone or ethylenimine group in its molecule. Examples of the resin preferably used include homopolymers such as polyacrylic acid, polymethacrylic acid, polyitaconic acid and polymaleic acid; copolymer resins of carboxyl group-containing monomers, such as acrylic acid-itaconic acid copolymer resins and acrylic acid-methacrylic acid copolymer resins; and copolymer resins of a carboxyl group-containing monomer and a hydrophilic group-containing monomer, such as methyl vinyl ether-maleic anhydride copolymer resins, methyl vinyl ether-maleic anhydride alkyl monoester copolymer resins and acrylic acid-N-vinyl-pyrrolidone copolymer resins.

No particular limitation is imposed on other physical properties of the water-soluble resin. However, it may preferably have a weight average molecular weight ranging from 1,000 to 500,000. If its molecular weight is not lower than 1,000, the viscosity-increasing effect by the change in pH is lessened. If the molecular weight exceeds 500,000, the initial viscosity of the ink is increased, so that the jetting property of the ink is lowered. Therefore, it is not very preferable to use any resins having such a low or high molecular weight. The resin may preferably have an acid value of 200 or higher. Any acid values lower than 200 are not preferred in some cases because the solubility of the resin in water becomes somewhat insufficient. The amount of the water-soluble resin to be added to the ink may preferably be within a range of from 0.1 to 30% by weight. If the amount is less than 0.1% by weight, the desired effect is lessened. If the amount exceeds 30% by weight, the initial viscosity of the ink is increased. It is not hence preferable to use the water-soluble resin in such a little or great amount.

As the alkali-soluble resin, there is preferably used a naturally-occurred alkali-soluble polymer such as casein, zein or pectin, or a copolymer resin of a hydrophilic monomer and a hydrophobic monomer. As the hydrophilic monomer, there is used a monomer containing, as a basic main chain, an acrylic, methacrylic, vinyl, ether, maleic or maleic anhydride group and having, as a side chain, a hydrophilic group such as a sulfonic, carboxylic, hydroxyl, amide, amino, ether or pyrrolidone group. As the hydrophobic monomer, there is preferably used styrene, an acrylic ester, isobutylene or the like. Specific examples of the alkali-soluble resin used include styrene-acrylic acid resins, styrene-acrylic acid-acrylic ester resins, styrene-maleic acid resins, styrene-maleic half ester resins, isobutylene-maleic anhydride resins, rosin-modified maleic acid resins, and besides water-soluble alkyds, water-soluble polyesters and water-soluble polyamides.

No particular limitation is imposed on other physical properties of the alkali-soluble resin. However, it may preferably have a weight average molecular weight ranging from 1,000 to 100,000, more preferably, from 1,000 to 50,000. If its molecular weight is not lower than 1,000, the desired effect is lessened. If the molecular weight exceeds 100,000, the initial viscosity of the ink is increased, so that the jetting property of the ink is lowered. Therefore, it is not very preferable to use any resins having such a low or high molecular weight. The amount of the alkali-soluble resin to be added to the ink may preferably be within a range of from 0.05 to 30% by weight, more preferably, from 0.1 to 15% by weight. If the amount is less than 0.05% by weight, the desired effect is lessened. If the amount exceeds 30% by weight, the initial viscosity of the ink is increased. It is not hence preferable to use the alkali-soluble resin in such a little or great amount.

As the alkali useful in the solubilization of the alkali-soluble resin, there can be used sodium hydroxide, sodium carbonate, ammonium carbonate, ammonia, sodium acetate, ammonium acetate, morpholine, or an alkanolamine such as monoethanolamine, diethanolamine, triethanolamine, ethyl monoethanolamine, normal butyl monoethanolamine, dimethyl ethanolamine, diethyl ethanolamine, ethyl diethanolamine, normal butyl diethanolamine, di-normal-butyl ethanolamine, monoisopropanolamine, diisopropanolamine or triisopropanolamine. The amount of the alkali to be used may preferably be within a range of from 5 to 200% by weight, more preferably, from 10 to 100% by weight based on the alkali-soluble resin though it varies according to the content of the alkali-soluble resin and the controlled pH level of the ink.

As dyes used in the ink, there can be used almost all water-soluble acid dyes, direct dyes, basic dyes and reactive dyes, which are described in COLOR INDEX. Any dyes not described in COLOR INDEX may also be used so long as they are soluble in water. No particular limitation is imposed on the amount of the dye to be used. However, it may preferably be within a range of from 0.1 to 20% by weight based on the total weight of the ink.

Each of the inks generally contain water and optionally, a water-soluble organic solvent in addition to any one of the above-described resins. Examples of the water-soluble solvent used include amides such as dimethylformamide and dimethylacetoamide, ketones such as acetone, ethers such as tetrahydrofuran and dioxane, polyalkylene glycols such as polyethylene glycol and polypropylene glycol, alkylene glycols such as ethylene glycol, propylene glycol, butylene glycol, triethylene glycol, thiodiglycol, hexylene glycol and diethylene glycol, lower alkyl ethers of polyhydric alcohols such as ethylene glycol methyl ether, diethylene glycol monomethyl ether and triethylene glycol monomethyl ether, monohydric alcohols such as ethanol and isopropyl alcohol, and besides, glycerol, 1,2,6-hexanetriol, N-methyl-2-pyrrolidone, 1,3-dimethyl-2-imidazolidinone, triethanolamine, sulfolane and dimethyl sulfoxide. No particular limitation is imposed on the content of the water-soluble organic solvent. However, it may preferably be within a range of from 1 to 80% by weight.

In addition to the above components, the inks may contain additives such as viscosity modifiers, pH adjustors, mildew-proofing agents, surfactants, antioxidants and evaporation accelerators, as needed.

When recording is conducted with three inks of yellow, magenta and cyan colors, resins added to the individual inks, and the pHs of the inks are adjusted in the following manner so as to achieve the above-described effects even when any two inks of the different colors come into contact with each other.

(1) The first ink selected from the yellow, magenta and cyan inks contains a water-soluble resin having at least one carboxyl group or anhydride thereof, or sulfonic group per molecule, and the pH ($pH_1$) of the ink is adjusted to 1 to 7.

(2) The second ink selected from the yellow, magenta and cyan inks contains a water-soluble resin having at least one carboxyl group or anhydride thereof, or sulfonic group per molecule, or an alkali-soluble resin, and the pH ($pH_2$) of the ink is adjusted to 5 to 9.

(3) The third ink selected from the yellow, magenta and cyan inks contains an alkali-soluble resin, and the pH ($pH_3$) of the ink is adjusted to 8 to 12.

Further, the first, second and third inks must satisfy the relationship of $pH_1 < pH_2 < pH_3$.

The first ink exhibits acidity when the water-soluble resin is dissolved therein, but may be adjusted with sodium hydroxide, aqueous ammonia or the like so as to keep the pH at 1 to 7.

The second ink is added with a water-soluble resin or an alkali-soluble resin. When the water-soluble resin is used, it is preferable to make the pH somewhat higher than the first ink, and render the acid value and molecular weight of the water-soluble resin smaller and lower, respectively, than those of the water-soluble resin used in the first ink in order to increase the viscosity of the ink when coming into contact with the first ink. When the alkali-soluble resin is used, it is preferable to make the pH somewhat lower than the third ink, and render the acid value and molecular weight of the alkali-soluble resin greater and lower, respectively, than those of the alkali-soluble resin used in the third ink in order to increase the deposition of the resin contained in the third ink when coming into contact with the third ink. The pH of each ink is adjusted by an acid such as acetic acid or hydrochloric acid, or the above-described alkali.

The third ink contains an alkali-soluble resin. In the third ink, an alkali and an acid may be used in combination with the alkali-soluble resin for dissolving the alkali-soluble resin in the ink and for adjusting pH, respectively.

In order to keep the pHs of the individual inks before use at the predetermined levels, a pH buffer such as lithium acetate may be added.

Although the case making use of the three inks of yellow, magenta and cyan colors has been described above, the same may be said of the case where recording is conducted with an ink of a black color in addition to the three inks. There is no particularly limited requisite to the addition of the black ink. In order to prevent bleeding with each of the above inks, it is however preferable to prepare the respective inks in the following manner.

(1) The first ink selected from the yellow, magenta, cyan and black inks contains a water-soluble resin having at least one carboxyl group or anhydride thereof, or sulfonic group per molecule, and the pH ($pH_1$) of the ink is adjusted to 1 to 6.

(2) The second ink selected from the yellow, magenta, cyan and black inks contains a water-soluble resin having at least one carboxyl group or anhydride thereof, or sulfonic group in unit molecule, or an alkali-soluble resin, and the pH ($pH_2$) of the ink is adjusted to 4 to 8.

(3) The third ink selected from the yellow, magenta, cyan and black inks contains an alkali-soluble resin, and the pH ($pH_3$) of the ink is adjusted to 6 to 10.

(4) The fourth ink selected from the yellow, magenta, cyan and black inks contains an alkali-soluble resin, and the pH ($pH_4$) of the ink is adjusted to 8 to 13.

Further, the first, second, third and fourth inks must satisfy the relationship of $pH_1 < pH_2 < pH_3 < pH_4$.

The third aspect of the present invention will hereinafter be described in detail.

The present inventors have found that when in a process wherein at least yellow, magenta, cyan and black inks are used and the inks are ejected on plain paper to record a color image, the four inks are prepared in such a manner that the yellow, magenta and cyan inks contain a penetrability-imparting surfactant or a penetrable solvent, the pH of the black ink is changed from the inks other than the black ink, and when the black ink is mixed with at least one of the other inks, at least a part of the compositions of the inks mixed deposits, or the viscosity of at least one ink increases, a record image which fulfills the above objects can be obtained, leading to the completion of the third aspect of the present invention.

More specifically, if yellow, magenta or cyan inks (hereinafter referred to as "color inks") contain a penetrability-imparting surfactant or a penetrable solvent, the penetrability of the color inks into recording paper is improved, so that the color inks penetrate the paper almost in a moment. Therefore, bleeding between the color inks can be prevented. However, when the black ink is prepared in the same manner as the color inks, the occurrence of feathering and the deterioration in quality of printed characters become noticeable, so that the penetrability can not be imparted. Therefore, the present inventors have considered that if the pH of the black ink is changed from the color inks so as to cause the deposition of a part of the ink composition, or viscosity increase in ink when both inks come into contact with each other, the dyes in the recording inks are fixed in the vicinity of the surface of the recording paper, whereby bleeding between the color ink and the black ink is prevented, and a high-quality image, which is high in image density, bright and even, and good in rub-off resistance, can be provided, leading to completion of the third aspect of the present invention.

In order to deposit the part of the ink compositions or to increase the viscosity of the ink when the black ink comes into contact with any one of the color inks, the deposition of the resin or the change in viscosity of the ink by the change in pH of the ink is used. For example, an ink with a water-soluble resin having at least one carboxyl group or anhydride thereof, or sulfonic group per molecule dissolved in water or the like is in a hydrated state that water is adsorbed on the electrically polarized portion of the carboxyl or sulfonic group. Now, an alkali-soluble resin and an alkali are contained in an ink other than the above ink in advance. When both inks come into contact with each other on the recording paper, the carboxyl group forms a salt to ionize. At this time, the resin molecule extends in the form of a thread owing to electrical repulsion, so that the viscosity of the first ink increases. On the other hand, the pH of the alkali-soluble resin contained in the second ink is lowered when coming into contact with the first ink on the recording paper, so that the deposition of the resin occurs. The dyes in the inks are fixed in the vicinity of the surface of the recording paper owing to both effects of the viscosity increase and the deposition of the alkali-soluble resin. Therefore, sufficient image density is achieved, and an image, in which evenness of image density is high, bleeding in a color image is prevented, a high character quality can be attained, and its rub-off resistance is also good, can be provided.

Now, there is therefore considered, for example, a combination that a water-soluble resin and an alkali-soluble resin, or an alkali-soluble resin and a water-soluble resin are contained in the color inks and in the black ink, respectively. In order to manifest efficiently the above-described effects, it is also necessary to suitably conduct the pH adjustment of the individual inks and the like, which will be described subsequently.

As described above, the yellow, magenta and cyan inks according to the third aspect of the present invention are added with a penetrability-imparting surfactant or a penetrable solvent.

Examples of such a surfactant used include anionic surfactants such as fatty acid salts, higher alcohol sulfuric ester salts, alkylbenzenesulfonates and higher alcohol phosphoric ester salts, cationic surfactants such as aliphatic amine salts and quaternary ammonium salts, nonionic surfactants such as ethylene oxide adducts of higher alcohols, ethylene oxide adducts of alkylphenols, aliphatic ethylene oxide adducts, ethylene oxide adducts of higher alcohol fatty acid esters, ethylene oxide adducts of higher alkyl amines, ethylene oxide adducts of fatty acid amides, ethylene oxide adducts of polypropylene glycol, higher alcohol fatty acid esters of polyhydric alcohols and alkanolamine fatty acid amides, and amino acid- and betaine-type amphoteric surfactants. No particular limitation is imposed on such a surfactant. However, nonionic surfactants such as ethylene oxide adducts of higher alcohols, ethylene oxide adducts of alkylphenols, ethylene oxide-propylene oxide copolymers, ethylene oxide adducts of acetylene glycol are preferably used. Further, it is particularly preferred that the number of moles of added ethylene oxide in the ethylene oxide adducts should be within a range of from 4 to 20.

No particular limitation is imposed on the amount of the surfactant to be added. However, it may preferably be within a range of from 0.01 to 10% by weight. If the amount is less than 0.01% by weight, in general, the penetrability can not be imparted to the desired extent although it depends upon the kind of the surfactant used. If the amount exceeds 10% by weight, the initial viscosity of the ink is increased. It is not hence preferable to use the surfactant in such a little or great amount.

Examples of the penetrable solvent preferably used include ethers such as tetrahydrofuran and dioxane, lower alkyl ethers of polyhydric alcohols such as ethylene glycol methyl ether, diethylene glycol monomethyl ether and triethylene glycol monomethyl ether, and monohydric alcohols such as ethanol and isopropyl alcohol.

No particular limitation is imposed on the amount of the surfactant to be added. However, it may preferably be within a range of from 0.1 to 20% by weight. If the amount is less than 0.1% by weight, in general, the penetrability can not be imparted to the desired extent although it depends upon the kind of the solvent used. If the amount exceeds 20% by weight, the solubility of a colorant used is somewhat lowered. It is not hence preferable to use the solvent in such a little or great amount.

Each of the inks contains a water-soluble resin or an alkali-soluble resin therein. As the water-soluble resin, there is used a naturally-occurring water-soluble polymer or a synthetic water-soluble resin which has at least one carboxyl group or anhydride thereof, or sulfonic group per molecule.

More specifically, a naturally-occurring water-soluble polymer such as alginic acid, carboxymethyl cellulose, pectinic acid or carboxymethylated starch, or a synthetic water-soluble resin synthesized by using at least one polymerizable monomer containing in its molecular unit a vinyl, acrylic, methacrylic, ether or maleic anhydride group, or the like may preferably be used.

More preferable examples of the synthetic water-soluble resin used in the inks include synthetic water-soluble resins such as polymers obtained by using, as a monomer, at least one of acrylic acid, methacrylic acid, itaconic acid, maleic acid and maleic anhydride, and copolymers of the above-described monomer and a hydrophilic monomer having a hydrophilic group such as a hydroxyl, amide, amino, ether, pyrrolidone or ethylenimine group in its molecule. Examples of the resin preferably used include homopolymers such as polyacrylic acid, polymethacrylic acid, polyitaconic acid and polymaleic acid; copolymer resins of carboxyl group-containing monomers, such as acrylic acid-itaconic acid copolymer resins and acrylic acid-methacrylic acid copolymer resins; and copolymer resins of a carboxyl group-containing monomer and a hydrophilic group-containing monomer, such as methyl vinyl ether-maleic anhydride copolymer resins, methyl vinyl ether-maleic anhydride alkyl monoester copolymer resins and acrylic acid-N-vinyl-pyrrolidone copolymer resins.

No particular limitation is imposed on other physical properties of the water-soluble resin. However, it may preferably have a weight average molecular weight ranging from 1,000 to 500,000. If its molecular weight is not lower than 1,000, the viscosity-increasing effect by the change in pH is lessened. If the molecular weight exceeds 500,000, the initial viscosity of the ink is increased, so that the jetting property of the ink is lowered. Therefore, it is not very preferable to use any resin having such a low or high molecular weight. The resin may preferably have an acid value of 200 or higher. Any acid values lower than 200 are not preferred in some cases because the solubility of the resin in water becomes somewhat insufficient. The amount of the water-soluble resin to be added to the ink may preferably be within a range of from 0.1 to 30% by weight. If the amount is less than 0.1% by weight, the desired effect is lessened. If the amount exceeds 30% by weight, the initial viscosity of the ink is increased. It is not hence preferable to use the water-soluble resin in such a little or great amount.

As the alkali-soluble resin, there is preferably used a naturally-occurred alkali-soluble polymer such as casein, zein or pectin, or a copolymer resin of a hydrophilic monomer and a hydrophobic monomer. As the hydrophilic monomer, there is used a monomer containing, as a basic main chain, an acrylic, methacrylic, vinyl, ether, maleic or maleic anhydride group and having, as a side chain, a hydrophilic group such as a sulfonic, carboxylic, hydroxyl, amide, amino, ether or pyrrolidone group. As the hydrophobic monomer, there is preferably used styrene, an acrylic ester, isobutylene or the like. Specific examples of the alkali-soluble resin used include styrene-acrylic acid resins, styrene-acrylic acid-acrylic ester resins, styrene-maleic acid resins, styrene-maleic half ester resins, isobutylene-maleic anhydride resins, rosin-modified maleic acid resins, and besides water-soluble alkyds, water-soluble polyesters and water-soluble polyamides.

No particular limitation is imposed on other physical properties of the alkali-soluble resin. However, it may preferably have a weight average molecular weight ranging from 1,000 to 100,000. If its molecular weight is not lower than 1,000, the desired effect is lessened. If the molecular weight exceeds 100,000, the initial viscosity of the ink is increased, so that the jetting property of the ink is lowered. Therefore, it is not very preferable to use any resin having such a low or high molecular weight. The amount of the alkali-soluble resin to be added to the ink may preferably be within a range of from 0.1 to 30% by weight. If the amount is less than 0.1% by weight, the desired effect is lessened. If the amount exceeds 30% by weight, the initial viscosity of the ink is increased. It is not hence preferable to use the alkali-soluble resin in such a little or great amount.

As the alkali useful in the solubilization of the alkali-soluble resin, there can be used sodium hydroxide, sodium carbonate, ammonium carbonate, ammonia, sodium acetate, ammonium acetate, morpholine, or an alkanolamine such as monoethanolamine, diethanolamine, triethanolamine, ethyl monoethanolamine, normal butyl monoethanolamine, dimethyl ethanolamine, diethyl ethanolamine, ethyl diethanolamine, normal butyl diethanolamine, di-normal-butyl ethanolamine, monoisopropanolamine, diisopropanolamine or triisopropanolamine. The amount of the alkali used may preferably be within a range of, generally, from 5 to 100% by weight based on the alkali-soluble resin though it varies according to the amount of the alkali-soluble resin to be used and the controlled pH level of the ink.

As dyes used in the ink, there can be used almost all water-soluble acid dyes, direct dyes, basic dyes and reactive dyes, which are described in COLOR INDEX. Any dyes not described in COLOR INDEX may also be used so long as they are soluble in water. No particular limitation is imposed on the amount of the dye to be used. However, it may preferably be within a range of from 0.1 to 20% by weight based on the total weight of the ink.

Each of the inks generally contains water and optionally, a water-soluble organic solvent in addition to any one of the above-described resins. Examples of the water-soluble solvent used include amides such as dimethylformamide and dimethylacetoamide, ketones such as acetone, ethers such as tetrahydrofuran and dioxane, polyalkylene glycols such as polyethylene glycol and polypropylene glycol, alkylene glycols such as ethylene glycol, propylene glycol, butylene glycol, triethylene glycol, thiodiglycol, hexylene glycol and diethylene glycol, lower alkyl ethers of polyhydric alcohols such as ethylene glycol methyl ether, diethylene glycol monomethyl ether and triethylene glycol monomethyl ether, monohydric alcohols such as ethanol and isopropyl alcohol, and besides, glycerol, 1,2,6-hexanetriol, N-methyl-2-pyrrolidone, 1,3-dimethyl-2-imidazolidinone, triethanolamine, sulfolane and dimethyl sulfoxide. No particular limitation is imposed on the content of the water-soluble organic solvent. However, it may preferably be within a range of from 1 to 80% by weight.

In addition to the above components, the inks may contain additives such as viscosity modifiers, pH adjustors, mildew-proofing agents, surfactants, antioxidants and evaporation accelerators, as needed.

If the water-soluble resin is contained in the yellow, magenta and cyan inks, supposing the pH of each of the inks is $pH_{ymc}$, it is preferable to adjust $pH_{ymc}$ to 1 to 7. In this case, the alkali-soluble resin is added to the black ink. Supposing the pH of the black ink is $pH_k$, $pH_k$ is adjusted to 7 to 13. However, these inks must satisfy the relationship of $pH_{ymc} < pH_k$. On the other hand, if the alkali-soluble resin is contained in the yellow, magenta and cyan inks, it is preferable to adjust $pH_{ymc}$ to 7 to 13. In this case, the water-soluble resin is added to the black ink, and $pH_k$ is adjusted to 1 to 7. However, these inks must satisfy the relationship of $pH_{ymc} > pH_k$.

With respect to the adjustment of pH of the inks, the pH of each ink generally falls within any one of the above pH ranges when its corresponding resin is dissolved in the ink. However, delicate adjustment is conducted with an acid or alkali such as acetic acid or aqueous ammonia.

In order to keep the pHs of the individual inks before use at the predetermined levels, a pH buffer such as lithium acetate may be added.

No particular limitation is imposed on the recording paper used in the present invention, and plain paper, which is routinely used, is preferably used.

The present invention not only prevents bleeding at boundary areas between inks of different colors, but also has sufficient effects in addition of black dots (inking) to a background or the like, so that good images can be formed.

Figure 2:
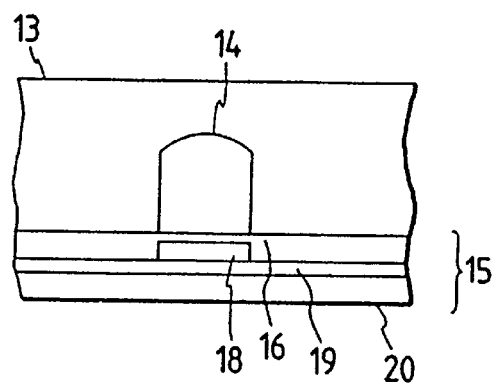
FIG. 2 is a transverse cross-sectional view of the head of the ink-jet recording apparatus.
Figure 3:
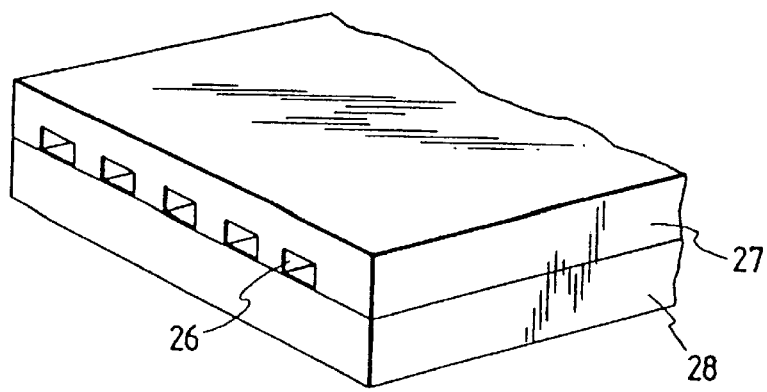
FIG. 3 is a perspective view of the appearance of another head of the ink-jet recording apparatus.

Recording apparatus useful in the practice of the present invention will then be described. In the present invention, an ink-jet recording system in which a recording signal is applied to an ink in a recording head to eject droplets of the ink by the thermal energy generated is suitably used. Examples of the construction of a head, which is a main component of an apparatus used in such a system, are illustrated in FIGS. 1, 2 and 3.

A head 13 is formed by bonding of a glass, ceramic or plastic plate or the like having a groove 14 through which an ink is passed, to a heating head 15, which is used for thermal recording and has a heating resistor (the drawing shows a head to which, however, the invention is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

An ink 21 comes up to an ejection orifice 22 and forms a meniscus 23 owing to a pressure P.

Now, upon application of electric signals to the electrodes 17-1, 17-2, the heating head 15 rapidly generates heat at the region shown by n to form bubbles in the ink 21 which is in contact with this region. The meniscus 23 of the ink is projected by the action of the pressure thus produced, and the ink 21 is ejected from the orifice 22 to a recording material 25 in the form of recording droplets 24. FIG. 3 schematically illustrates a multi-head composed of an array of a number of heads as shown in FIG. 1. The multi-head is formed by closely bonding a glass plate or the like 27 having a number of channels 26 to a heating head 28 similar to the head as illustrated in FIG. 1.

Incidentally, FIG. 1 is a cross-sectional view of the head 13 taken along the flow path of the ink, and FIG. 2 is a cross-sectional view taken along line 2—2 in FIG. 1.

Figure 4:
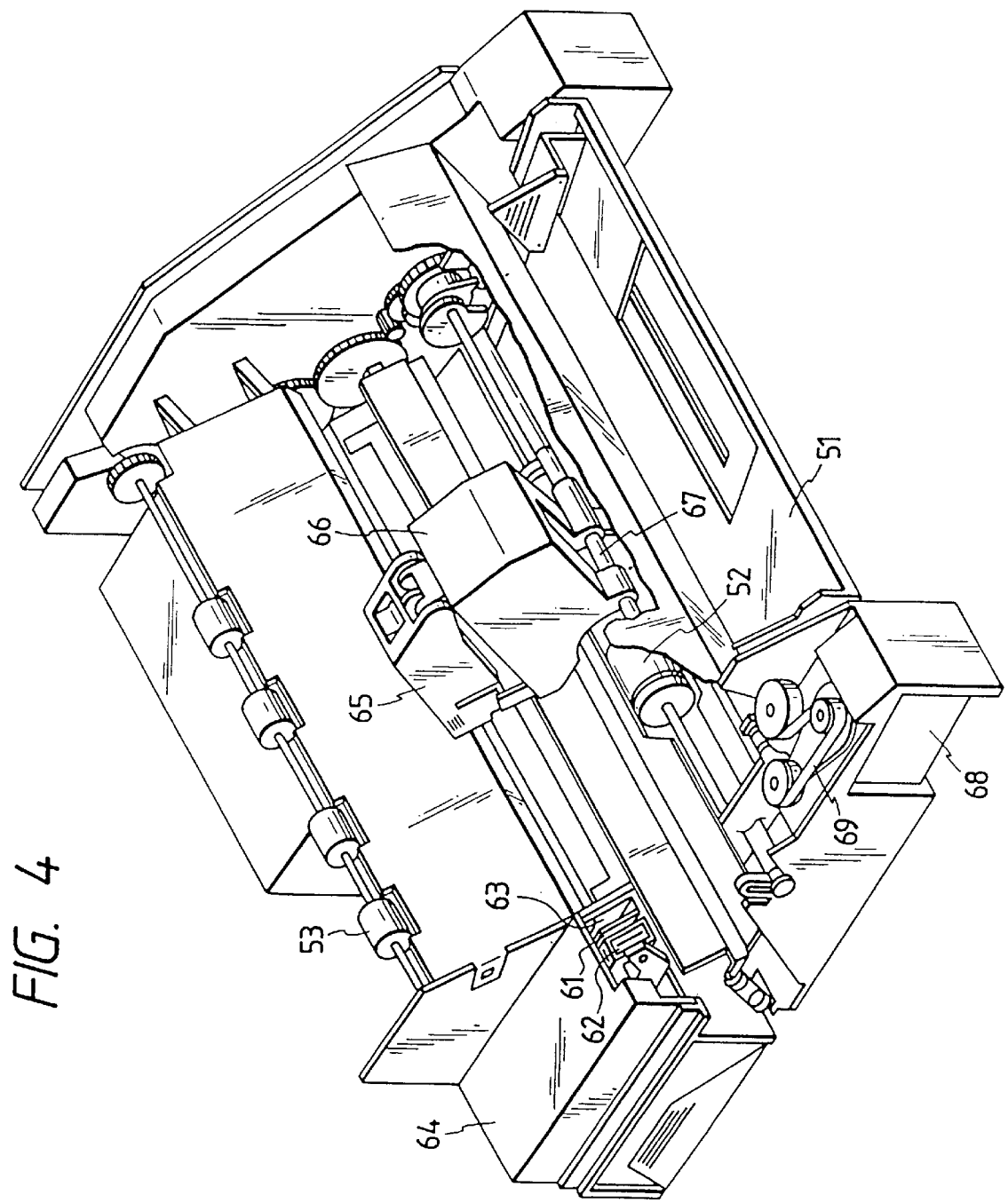
FIG. 4 is a perspective view of an illustrative ink-jet recording apparatus.

FIG. 4 illustrates an example of an ink-jet recording apparatus in which such a head has been incorporated.

In FIG. 4, reference numeral 61 designates a blade serving as a wiping member, one end of which is a stationary end held by a blade-holding member to form a cantilever. The blade 61 is provided at the position adjacent to the region in which a recording head makes a record, and is so constituted that it moves in the direction perpendicular to the direction in which the recording head is moved and comes into contact with the face of ejection openings to cap it. Reference numeral 63 denotes an ink-absorbing member provided adjoiningly to the blade 61 and, similar to the blade 61, held in such a form that it protrudes into the course through which the recording head is moved.

The above-described blade 61, cap 62 and absorbing member 63 constitute an ejection-recovery portion 64, where the blade 61 and absorbing member 63 remove water, dust and/or the like from the face of the ink-ejecting openings.

Reference numeral 65 designates the recording head having an ejection-energy-generating means and serving to eject the ink onto a recording material set in an opposing relation with the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a paper feeding part from which the recording materials are separately inserted, and paper feed rollers driven by a motor (not illustrated), respectively. With such construction, the recording material is fed to the position opposite to the ejection opening face of the recording head, and discharged from a paper discharge section provided with paper discharge rollers 53 with the progress of recording.

In the above constitution, the cap 62 in the head recovery portion 64 is receded from the moving course of the recording head 65 when the recording head 65 is returned to its home position, for example, after completion of recording, and the blade 61 remains protruded into the course of motion. As a result, the ejection opening face of the recording head 65 is wiped. When the cap 62 comes into contact with the ejection opening face of the recording head 65 to cap it, the cap 62 is moved so as to protrude to the moving course of the recording head.

When the recording head 65 is moved from its home position to the position at which recording is started, the cap 62 and the blade 61 are at the same positions as the positions upon the wiping as described above. As a result, the ejection opening face of the recording head 65 is also wiped at the time of this movement.

The above movement of the recording head to its home position is made not only when the recording is completed or the recording head is recovered for ejection, but also when the recording head is moved between recording regions for the purpose of recording, during which it is moved to the home position adjacent to each recording region at given intervals, where the ejection opening face is wiped in accordance with this movement.

Figure 5:
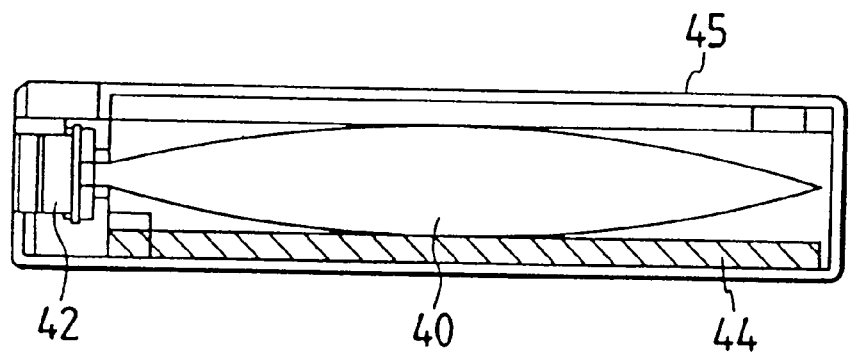
FIG. 5 is a longitudinal cross-sectional view of an ink cartridge.

FIG. 5 illustrates an exemplary ink cartridge 45 in which an ink fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink absorbing member for receiving a waste ink.

It is preferred that the ink container portion is formed of a polyolefin, in particular, polyethylene, at its surface with which the ink comes into contact.

The ink-jet recording apparatus used in the present invention may not be limited to the apparatus as described above in which the head and the ink cartridge are separately provided. Therefore, a device in which these members are integrally formed as shown in FIG. 6 can also be preferably used.

Figure 6:
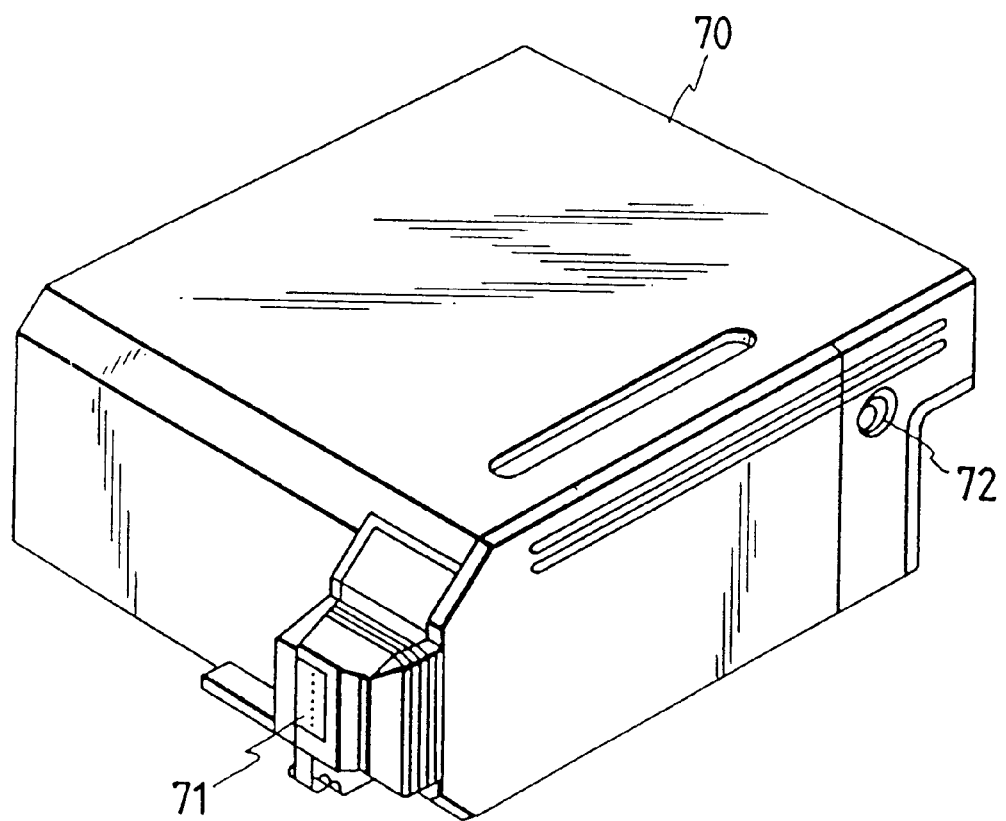
FIG. 6 is a perspective view of a recording unit.

In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices. For example, polyurethane may be used as a material for the ink-absorbing member. Reference numeral 72 indicates an air passage for communicating the interior of the recording unit 70 with the atmosphere. This recording unit 70 can be used in place of the recording head shown in FIG. 3, and is detachably installed on the carriage 66. Incidentally, in the recording apparatus used in the present invention, the ink-jet recording apparatus in which heat energy is caused to act on an ink to eject droplets of the ink has been described by way of example. However, the present invention can also be used in other ink-jet recording apparatus such as a piezo-system making use of a piezoelectric element.

Figure 7:
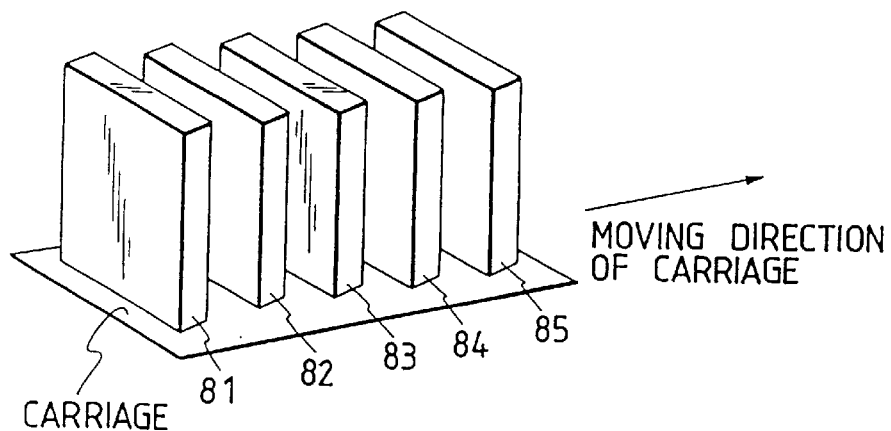
FIG. 7 is a perspective view illustrating a recording part used in examples of the present invention, in which a plurality of recording heads is arranged.
Figure 8:
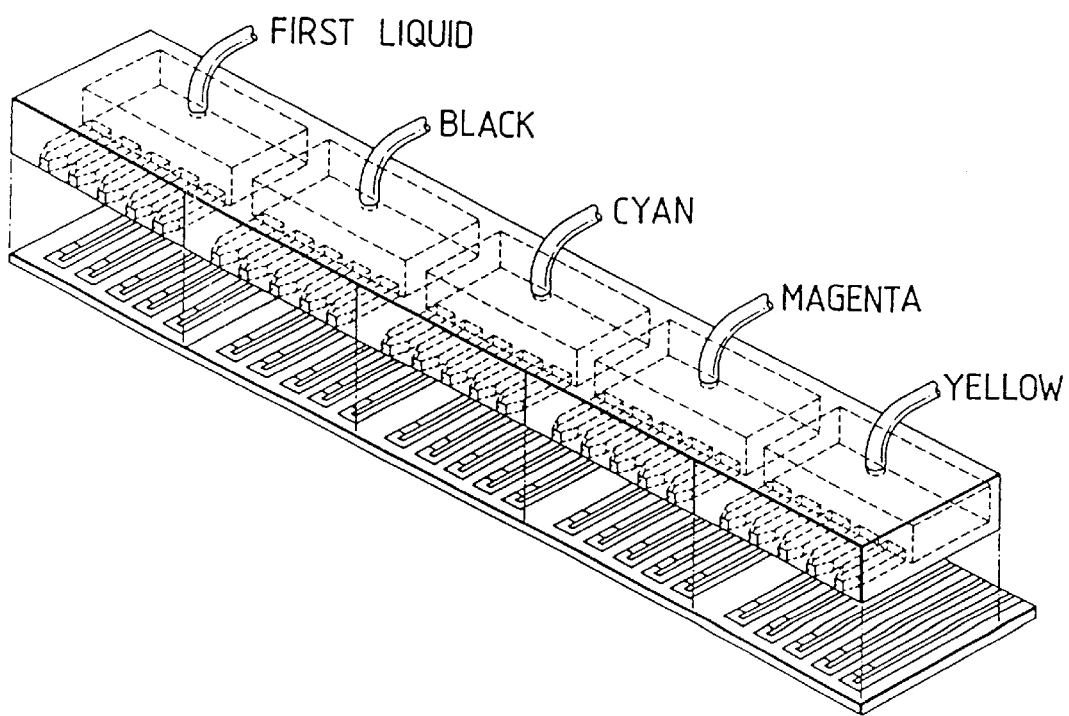
FIG. 8 is a perspective view of another recording head used in the present invention.

In the case where the color recording process according to the first aspect of the present invention is carried out, for example, a recording apparatus in which five recording heads, each of which has been illustrated in FIG. 3, are arranged on a carriage, is used. An example thereof is illustrated in FIG. 7. Reference numerals 81, 82, 83 and 84 indicate recording heads for ejecting inks of yellow, magenta, cyan and black colors, respectively. Reference numeral 85 designates a head for ejection of the first liquid. The heads are arranged in the above-described recording apparatus and serve to eject the recording inks of the different colors according to recording signals. Before the ejection of the inks, the first liquid is applied in advance to at least portions of recording paper where the recording inks of the different colors are to applied thereto. FIG. 7 shows the case where the five recording heads have been used. However, the present invention is not limited thereto. As shown in FIG. 8, preference is given even to the case where the flow paths of the yellow, magenta, cyan and black inks and the first liquid are separately provided in one recording head.

Figure 9:
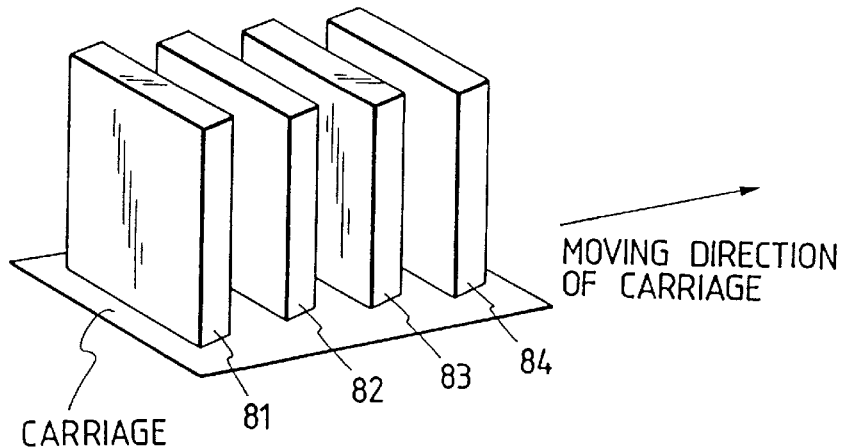
FIG. 9 is a perspective view illustrating another recording part used in examples of the present invention, in which a plurality of recording heads is arranged.
Figure 10:
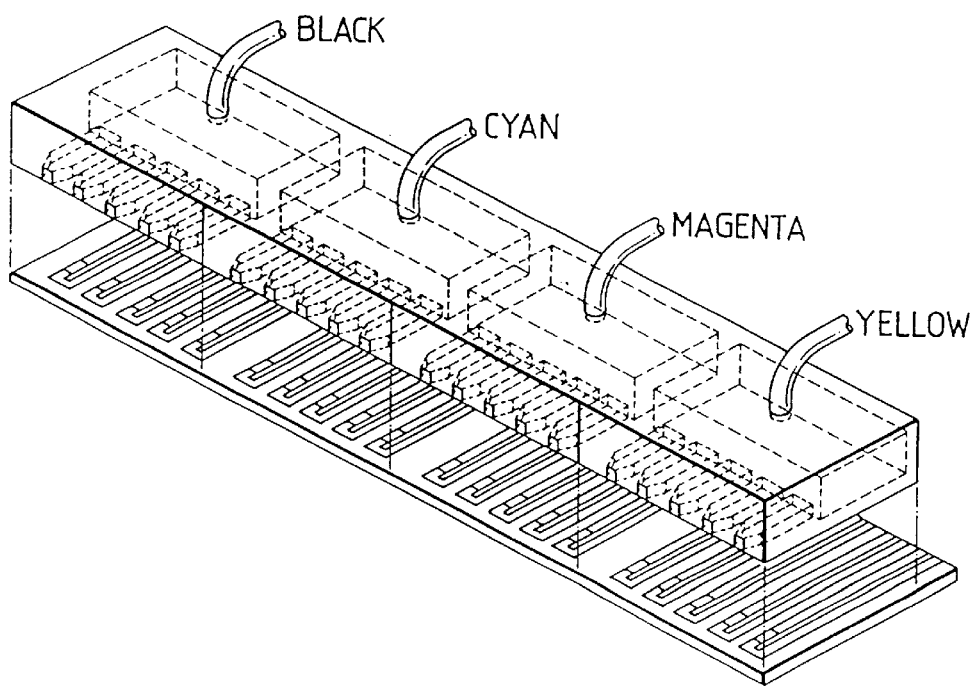
FIG. 10 is a perspective view of a further recording head used in the present invention.

In the case where the color recording processes according to the second and third aspects of the present invention are carried out, for example, a recording apparatus in which four recording heads, each of which has been illustrated in FIG. 3, are arranged on a carriage, is used. An example thereof is illustrated in FIG. 9. Reference numerals 81, 82, 83 and 84 indicate recording heads for ejecting inks of yellow, magenta, cyan and black colors, respectively. The heads are arranged in the above-described recording apparatus and serve to eject the recording inks of the different colors according to recording signals. FIG. 9 shows the case where the four recording heads have been used. However, the present invention is not limited thereto. As shown in FIG. 10, preference is given even to the case where the flow paths of the yellow, magenta, cyan and black inks are separately provided in one recording head.

The present invention will hereinafter be described more specifically by the following examples and comparative examples. Incidentally, all designations of "part" or "parts" and "%" as will be used in the following examples mean part or parts by weight and % by weight unless expressly noted.

EXAMPLES 1 to 10

First of all, the following respective components were mixed into solutions, and the resultant solutions were then filtered under pressure through a membrane filter (Fluoropore Filter, trade name: product of Sumitomo Electric Industries, Ltd.) having a pore size of 0.22 $\mu$m, thereby obtaining first liquids A through G.

| | | |
|---|---|---|
| (A) | Methyl vinyl ether-maleic anhydride copolymer (Mw = 20,000) | 1 part |
| | Diethylene glycol | 20 parts |
| | Water | 79 parts |
| | pH = 4.8 | |
| (B) | Polyacrylic acid (Mw = 10,000) | 5 parts |
| | Diethylene glycol | 21 parts |
| | Water | 74 parts |
| | pH = 3.1 | |
| (C) | Acrylic acid-itaconic acid copolymer (Mw = 8,000) | 10 parts |
| | Diethylene glycol | 40 parts |
| | Water | 50 parts |
| | pH = 2.2 | |
| (D) | Pectinic acid | 3 parts |
| | Diethylene glycol | 30 parts |
| | Water | 67 parts |
| | pH = 4.2 | |
| (E) | Methyl vinyl ether-maleic anhydride copolymer (Mw = 67,000) | 7 parts |
| | Diethylene glycol | 15 parts |
| | Water | 78 parts |
| | pH = 2.5 | |

(F) A liquid having the same composition as (A) was prepared and then partly neutralized with aqueous ammonia to keep pH 6.

(G) A liquid having the same composition as (B) was prepared and then partly neutralized with aqueous ammonia to keep pH 6.

Then, the following respective components were mixed into solutions, and the resultant solutions were filtered under pressure through a membrane filter (Fluoropore Filter, trade name: product of Sumitomo Electric Industries, Ltd.) having a pore size of 0.22 $\mu$m, thereby obtaining sets of inks (1) through (5) of yellow, magenta, cyan and black colors.

(1)

| | | |
|---|---|---|
| Yellow: | Styrene-acrylic acid copolymer (Mw = 10,000) | 3 parts |
| | Sodium hydroxide | 0.5 part |
| | C.I. Direct Yellow 86 | 2 parts |
| | Diethylene glycol | 30 parts |
| | Water | 64.5 parts |
| Magenta: | Styrene-acrylic acid copolymer (Mw = 10,000) | 3 parts |
| | Sodium hydroxide | 0.5 part |
| | C.I. Acid Red 35 | 3 parts |
| | Diethylene glycol | 30 parts |
| | Water | 63.5 parts |
| Cyan: | Styrene-acrylic acid copolymer (Mw = 10,000) | 3 parts |
| | Sodium hydroxide | 0.5 part |
| | C.I. Direct Blue 199 | 2 parts |
| | Diethylene glycol | 30 parts |
| | Water | 64.5 parts |
| Black: | Styrene-acrylic acid copolymer (Mw = 10,000) | 3 parts |
| | Sodium hydroxide | 0.5 part |
| | C.I. Food Black 2 | 2 parts |
| | Diethylene glycol | 30 parts |
| | Water | 64.5 parts |

(2)

| | | |
|---|---|---|
| Yellow: | Styrene-maleic acid copolymer (Mw = 30,000) | 1 part |
| | Aqueous ammonia | 0.5 part |
| | C.I. Direct Yellow 86 | 2 parts |
| | Diethylene glycol | 30 parts |
| | Water | 66.5 parts |
| Magenta: | Styrene-maleic acid copolymer (Mw = 30,000) | 1 part |
| | Aqueous ammonia | 0.5 part |
| | C.I. Acid Red 35 | 3 part |
| | Diethylene glycol | 30 parts |
| | Water | 65.5 parts |
| Cyan: | Styrene-maleic acid copolymer (Mw = 30,000) | 1 part |
| | Aqueous ammonia | 0.5 part |
| | C.I. Direct Blue 199 | 2 parts |
| | Diethylene glycol | 30 parts |
| | Water | 66.5 parts |
| Black: | Styrene-maleic acid copolymer (Mw = 30,000) | 1 part |
| | Aqueous ammonia | 0.5 part |
| | C.I. Food Black 2 | 2 parts |
| | Diethylene glycol | 30 parts |
| | Water | 66.5 parts |

(3)

| | | |
|---|---|---|
| Yellow: | Isobutylene-maleic anhydride copolymer (Mw = 20,000) | 2 parts |
| | Sodium hydroxide | 0.5 part |
| | C.I. Direct Yellow 86 | 2 parts |
| | Diethylene glycol | 30 parts |
| | Water | 65.5 parts |
| Magenta: | Isobutylene-maleic anhydride copolymer (Mw = 20,000) | 2 parts |
| | Sodium hydroxide | 0.5 part |
| | C.I. Acid Red 35 | 3 parts |
| | Diethylene glycol | 30 parts |
| | Water | 64.5 parts |
| Cyan: | Isobutylene-maleic anhydride copolymer (Mw = 20,000) | 2 parts |
| | Sodium hydroxide | 0.5 part |
| | C.I. Direct Blue 199 | 2 parts |
| | Diethylene glycol | 30 parts |
| | Water | 65.5 parts |
| Black: | Isobutylene-maleic anhydride copolymer (Mw = 20,000) | 2 parts |
| | Sodium hydroxide | 0.5 part |
| | C.I. Food Black 2 | 2 parts |
| | Diethylene glycol | 30 parts |
| | Water | 65.5 parts |

(4)

| | | |
|---|---|---|
| Yellow: | Styrene-acrylic acid-acrylic ester copolymer (Mw = 100,000) | 1 part |
| | Sodium hydroxide | 0.3 part |
| | C.I. Direct Yellow 86 | 2 parts |
| | Diethylene glycol | 30 parts |
| | Water | 66.7 parts |
| Magenta: | Styrene-acrylic acid-acrylic ester copolymer (Mw= 100,000) | 1 part |
| | Sodium hydroxide | 0.3 part |
| | C.I. Acid Red 35 | 3 parts |
| | Diethylene glycol | 30 parts |
| | Water | 65.7 parts |
| Cyan: | Styrene-acrylic acid-acrylic ester copolymer (Mw = 100,000) | 1 part |
| | Sodium hydroxide | 0.3 part |
| | C.I. Direct Blue 199 | 2 parts |
| | Diethylene glycol | 30 parts |
| | Water | 66.7 parts |
| Black: | Styrene-acrylic acid-acrylic ester copolymer (Mw = 10,000) | 1 part |
| | Sodium hydroxide | 0.3 part |
| | C.I. Food Black 2 | 2 parts |
| | Diethylene glycol | 30 parts |
| | Water | 66.7 parts |

(5)

| | | |
|---|---|---|
| Yellow: | Styrene-maleic acid copolymer (Mw = 1,600) | 5 parts |
| | Sodium hydroxide | 2.5 parts |
| | C.I. Direct Yellow 86 | 2 parts |
| | Diethylene glycol | 20 parts |
| | Water | 70.5 parts |
| Magenta: | Styrene-maleic acid copolymer (Mw = 1,600) | 5 parts |
| | Sodium hydroxide | 2.5 parts |
| | C.I. Acid Red 35 | 3 parts |
| | Diethylene glycol | 20 parts |
| | Water | 69.5 parts |
| Cyan: | Styrene-maleic acid copolymer (Mw = 1,600) | 5 parts |
| | Sodium hydroxide | 2.5 parts |
| | C.I. Direct Blue 199 | 2 parts |
| | Diethylene glycol | 20 parts |
| | Water | 70.5 parts |
| Black: | Styrene-maleic acid copolymer (Mw = 1,600) | 5 parts |
| | Sodium hydroxide | 2.5 parts |
| | C.I. Food Black 2 | 2 parts |
| | Diethylene glycol | 20 parts |
| | Water | 70.5 parts |

The pHs of the above-prepared inks were measured and all found to fall within a range of from 7 to 12.

Using the thus-obtained first liquids and inks, recording was then conducted on commercially-available paper for copying, or bond paper. As an ink-jet recording apparatus, was used a recording apparatus similar to that shown in FIG. 4. Color images were formed using 5 recording heads as illustrated in FIG. 7. Incidentally, the individual recording heads used were the same as that used in BJC 820 (trade name, ink-jet printer manufactured by Canon Inc.). The drive conditions of each of the recording heads, i.e., conditions for energizing a heater were as follows:

Voltage applied: 28 V

Pulse length: 3.2 μsec

Drive frequency: 5 kHz.

The combinations of the first liquid and ink set used are shown in Table 1. The thus-obtained records were evaluated in the following manner. The results are shown in Table 1.

Record density

After English characters and numerals and solid prints were recorded on commercially-available paper for copying, or bond paper, and the resulting records were left standing for 1 hour, their record densities were determined by a Macbeth RD915 (Trade name; manufactured by Macbeth Company) and ranked in accordance with the following standard:

A: Record density as to the ink of each color was higher than 1.25

B: Record density as to the ink of each color was 1.15 to 1.25; and

C: Record density as to the ink of each color was lower than 1.15.

Resistance to bleeding

Solid prints of the respective inks of yellow, magenta, cyan and black colors were recorded in contiguity with one another on commercially-available paper for copying, or bond paper to observe whether color bleeding and/or uneven color mixing occurred at boundary areas between the respective inks or not. The resistance to bleeding was ranked in accordance with the following standard:

A: Neither color bleeding nor uneven color mixing occurred;

B: Color bleeding and/or uneven color mixing occurred to a slight extent, which would cause no problem in actual use; and C: Color bleeding and uneven color mixing occurred, which would cause problems in actual use.

Rub-off resistance

After English characters and numerals and solid prints were recorded on commercially-available paper for copying, or bond paper, and the resulting records were left standing for 1 hour, recorded areas were rubbed forward and backward ten times with silubon paper to observe whether smear on the recording paper and rubbing out of recorded areas occurred or not. The rub-off resistance was ranked in accordance with the following standard:

A: Neither smear on the recording paper nor rubbing off of the recorded areas occurred;

B: slight smear observed about the recorded areas on the recording paper, which would cause no problem in actual use; and C: Smear recognized about the recorded areas on the recording paper, which would cause problems in actual use.

Comparative Example 1

Recording was conducted in the same manner as in Examples 1 to 10 except that a liquid in which the methyl vinyl ether-maleic anhydride copolymer was omitted from the first liquid in (A) was used as a first liquid and liquids with the styrene-acrylic acid copolymer omitted from the respective inks in (1) were used as inks.

Comparative Example 2

Recording was conducted in the same manner as in Examples 1 to 10 except that a liquid in which the methyl vinyl ether-maleic anhydride copolymer was omitted from the first liquid in (A) was used as a first liquid and the inks in (1) were used as inks.

Comparative Example 3

Recording was conducted in the same manner as in Examples 1 to 10 except that the first liquid in (A) was used as a first liquid and liquids in which the styrene-acrylic acid copolymer was omitted from the respective inks in (1) were used as inks.

Records obtained in Comparative Examples 1 to 3 were evaluated in the same manner as in Examples 1 to 10. The results are shown in Table 1.

TABLE 1

|  | First liquid | Ink set | Record density | Resistance to bleeding | Rub-off resistance |
|---|---|---|---|---|---|
| Ex. 1 | (A) | (1) | A | A | A |
| Ex. 2 | (B) | (2) | A | A | A |
| Ex. 3 | (C) | (3) | A | A | A |
| Ex. 4 | (D) | (4) | A | A | A |
| Ex. 5 | (E) | (5) | A | A | A |
| Ex. 6 | (F) | (1) | A | A | A |
| Ex. 7 | (G) | (1) | A | A | A |
| Ex. 8 | (A) | (2) | A | A | A |
| Ex. 9 | (A) | (3) | A | A | A |
| Ex. 10 | (A) | (4) | A | A | A |
| Comp. Ex. 1 | *1 | *1 | C | C | A |
| Comp. Ex. 2 | *1 | *1 | C | C | A |
| Comp. Ex. 3 | *1 | *1 | C | C | A |

*1: Described in the text.

EXAMPLES 11 to 17

First of all, the following respective components were mixed into solutions, and the resultant solutions were then filtered under pressure through a membrane filter (Fluoropore Filter, trade name: product of Sumitomo Electric Industries, Ltd.) having a pore size of 0.22 μm, thereby obtaining sets of inks (6) through (9) of yellow, magenta and cyan colors and sets of inks (10) through (12) of yellow, magenta, cyan and black colors.

(6)

| Yellow: | Acrylic acid-itaconic acid copolymer (Mw = 5,000) | 2 parts |
| | C.I. Direct Yellow 86 | 2 parts |
| | Diethylene glycol | 30 parts |
| | Water | 66 parts |
| Magenta: | Styrene-monoethyl maleate copolymer | 3 parts |
| | Sodium hydroxide | 0.2 part |
| | C.I. Acid Red 35 | 3 parts |
| | Diethylene glycol | 30 parts |
| | Water | 63.8 parts |
| Cyan: | C.I. Direct Blue 199 | 2 parts |
| | Diethylene glycol | 30 parts |
| | Water | 68 parts |

(7)

| Yellow: | Methyl vinyl ether-maleic anhydride copolymer (Mw = 2,000) | 3 parts |
| | C.I. Direct Yellow 86 | 2 parts |
| | Diethylene glycol | 30 parts |
| | Water | 65 parts |
| Magenta: | Styrene-maleic acid copolymer (Mw = 1,000) | 3 parts |
| | Sodium hydroxide | 0.2 part |
| | C.I. Acid Red 35 | 3 parts |
| | Diethylene glycol | 30 parts |
| | Water | 63.8 parts |
| Cyan: | Styrene-acrylic acid copolymer (Mw = 3,000) | 3 parts |
| | Sodium hydroxide | 0.5 part |
| | C.I. Direct Blue 199 | 2 parts |
| | Diethylene glycol | 30 parts |
| | Water | 64.5 parts |

(8)

| Yellow: | Styrene-maleic acid copolymer (Mw = 90,000) | 1 part |
| | Aqueous ammonia | 0.5 part |
| | C.I. Direct Yellow 86 | 2 parts |

|           |                                                          |           |
|-----------|----------------------------------------------------------|-----------|
|           | Diethylene glycol                                        | 30 parts  |
|           | Water                                                    | 66.5 parts |
| Magenta:  | Acrylic acid-itaconic acid copolymer (Mw = 80,000)       | 1 part    |
|           | C.I. Acid Red 35                                         | 3 parts   |
|           | Diethylene glycol                                        | 30 parts  |
|           | Water                                                    | 66 parts  |
| Cyan:     | Polyacrylic acid (Mw = 400,000)                          | 1 part    |
|           | C.I. Direct Blue 199                                     | 2 parts   |
|           | Diethylene glycol                                        | 30 parts  |
|           | Water                                                    | 67 parts  |

(9)

|           |                                                          |           |
|-----------|----------------------------------------------------------|-----------|
| Yellow:   | Carboxymethylated starch                                 | 13 parts  |
|           | C.I. Direct Yellow 86                                    | 2 parts   |
|           | Diethylene glycol                                        | 30 parts  |
|           | Water                                                    | 55 parts  |
| Magenta:  | Styrene-maleic acid polymer copolymer (Mw = 3,000)       | 13 parts  |
|           | Sodium hydroxide                                         | 0.2 part  |
|           | C.I. Acid Red 35                                         | 3 parts   |
|           | Diethylene glycol                                        | 30 parts  |
|           | Water                                                    | 53.8 parts |
| Cyan:     | Styrene-acrylic acid copolymer (Mw = 10,000)             | 13 parts  |
|           | Sodium hydroxide                                         | 0.5 part  |
|           | C.I. Direct Blue 199                                     | 2 parts   |
|           | Diethylene glycol                                        | 30 parts  |
|           | Water                                                    | 54.5 parts |

(10)

|           |                                                          |           |
|-----------|----------------------------------------------------------|-----------|
| Yellow:   | Pectinic acid                                            | 2 parts   |
|           | C.I. Direct Yellow 86                                    | 2 parts   |
|           | Diethylene glycol                                        | 30 parts  |
|           | Water                                                    | 66 parts  |
| Magenta:  | Methyl vinyl ether-maleic anhydride copolymer (Mw = 5,000) | 2 parts |
|           | C.I. Acid Red 35                                         | 3 parts   |
|           | Diethylene glycol                                        | 30 parts  |
|           | Water                                                    | 65 parts  |
| Cyan:     | Isobutylene-maleic anhydride copolymer (Mw = 2,000)      | 2 parts   |
|           | Sodium hydroxide                                         | 0.3 part  |
|           | C.I. Direct Blue 199                                     | 2 parts   |
|           | Diethylene glycol                                        | 30 parts  |
|           | Water                                                    | 65.7 parts |
| Black:    | Isobutylene-maleic anhydride copolymer (Mw = 20,000)     | 2 parts   |
|           | Sodium hydroxide                                         | 0.5 part  |
|           | C.I. Food Black 2                                        | 2 parts   |
|           | Diethylene glycol                                        | 30 parts  |
|           | Water                                                    | 65.5 parts |

(11)

|           |                                                          |           |
|-----------|----------------------------------------------------------|-----------|
| Yellow:   | Polyacrylic acid (Mw = 100,000)                          | 1 part    |
|           | C.I. Direct Yellow 86                                    | 2 parts   |
|           | Diethylene glycol                                        | 30 parts  |
|           | Water                                                    | 67 parts  |
| Magenta:  | Methyl vinyl ether-anhydrous monoethyl maleate copolymer (Mw = 10,000) | 2 parts |
|           | C.I. Acid Red 35                                         | 3 parts   |
|           | Diethylene glycol                                        | 30 parts  |
|           | Water                                                    | 65 parts  |
| Cyan:     | Styrene-acrylic acid copolymer (Mw = 10,000)             | 2 parts   |
|           | Sodium hydroxide                                         | 0.3 part  |
|           | C.I. Direct Blue 199                                     | 2 parts   |
|           | Diethylene glycol                                        | 30 parts  |
|           | Water                                                    | 66.7 parts |
| Black:    | Styrene-acrylic acid-acrylic ester (Mw = 50,000)         | 2 parts   |
|           | Sodium hydroxide                                         | 0.5 part  |
|           | C.I. Food Black 2                                        | 2 parts   |
|           | Diethylene glycol                                        | 30 parts  |
|           | Water                                                    | 65.5 parts |

(12)

|           |                                                          |           |
|-----------|----------------------------------------------------------|-----------|
| Yellow:   | Polyitaconic acid (Mw = 16,000)                          | 2 parts   |
|           | C.I. Direct Yellow 86                                    | 2 parts   |
|           | Diethylene glycol                                        | 20 parts  |
|           | Water                                                    | 75 parts  |
| Magenta:  | Acrylic acid-methacrylic acid (Mw = 5,600)               | 4 parts   |
|           | C.I. Acid Red 35                                         | 3 parts   |
|           | Diethylene glycol                                        | 20 parts  |
|           | Water                                                    | 73 parts  |
| Cyan:     | Styrene-maleic acid copolymer (Mw = 1,600)               | 5 parts   |
|           | Sodium hydroxide                                         | 1.5 part  |
|           | C.I. Direct Blue 199                                     | 2 parts   |
|           | Diethylene glycol                                        | 20 parts  |
|           | Water                                                    | 71.5 parts |
| Black:    | Styrene-maleic acid copolymer (Mw = 7,600)               | 4 parts   |
|           | Sodium hydroxide                                         | 2.5 part  |
|           | C.I. Food Black 2                                        | 2 parts   |
|           | Diethylene glycol                                        | 20 parts  |
|           | Water                                                    | 71.5 parts |

The pHs of the above-described inks of the different colors were measured and adjusted with acetic acid or aqueous ammonia as shown in Table 2.

Using the thus-obtained ink sets (6) through (12), recording was then conducted on commercially-available paper for copying, or bond paper, thereby obtaining the results of Examples 11 to 17. However, in the case where the ink set (6) was used, recording was conducted at the same time with the yellow and magenta inks. After 3 minutes, recording is resumed with the cyan ink. In the cases where the ink sets (7) through (9) were used, recording was conducted at the same time with the three inks of the different colors. Further, in the cases where the ink sets (6) through (9) were used, a black color was produced by combining the yellow, magenta and cyan inks with each other. In the cases where the ink sets (10) through (12) were used, recording was conducted at the same time with the four inks of the different colors. As an ink-jet recording apparatus, was used a recording apparatus similar to that shown in FIG. 4, and color images were formed using 4 recording heads as illustrated in FIG. 9. Incidentally, the individual recording heads used were the same as that used in BJC 820 (trade name, ink-jet printer manufactured by Canon Inc.). The drive conditions of each of the recording heads, i.e., conditions for energizing a heater were as follows:

Voltage applied: 28 V

Pulse length: 3.2 μsec

Drive frequency: 5 kHz.

Comparative Example 4

Recording was conducted in the same manner as in Examples 11 to 17 except that liquids in which the methyl vinyl ether-maleic anhydride copolymer, the styrene-maleic acid copolymer or the styrene-acrylic acid copolymer was omitted from the inks of their corresponding colors in (7) were used in an ink set.

Comparative Example 5

Recording was conducted in the same manner as in Examples 11 to 17 except that liquids in which the methyl vinyl ether-maleic anhydride copolymer or the styrene-maleic acid copolymer was omitted from the inks of their corresponding colors in (7) were used in an ink set.

Comparative Example 6

Recording was conducted in the same manner as in Examples 11 to 17 except that liquids in which the methyl vinyl ether-maleic anhydride copolymer or the styrene-acrylic acid copolymer was omitted from the inks of their corresponding colors in (7) were used in an ink set.

Comparative Example 7

Recording was conducted in the same manner as in Examples 11 to 17 except that liquids in which the styrene-maleic acid copolymer or the styrene-acrylic acid copolymer was omitted from the inks of their corresponding colors in (7) were used in an ink set.

The record densities, resistance to bleeding and rub-off resistance of the records in Examples 11 to 17 and Comparative Examples 4 to 7 were evaluated in the same manner as in Examples 1 to 10. The results are shown in Table 3.

TABLE 2

| Ink set | pH level adjusted | | | |
|---|---|---|---|---|
| | Yellow | Magenta | Cyan | Black |
| (6) | 4.2 | 9.3 | 7.6 | — |
| (7) | 5.6 | 8.8 | 11.3 | — |
| (8) | 9.8 | 5.9 | 2.1 | — |
| (9) | 3.3 | 8.1 | 9.8 | — |
| (10) | 3.3 | 5.9 | 8.3 | 11.2 |
| (11) | 2.2 | 4.9 | 7.7 | 9.2 |
| (12) | 5.0 | 7.8 | 9.8 | 12.4 |

TABLE 3

| | Record density | Resistance to bleeding | Rub-off resistance |
|---|---|---|---|
| Example 11 Ink set (6) | A | A | A |
| Example 12 Ink set (7) | A | A | A |
| Example 13 Ink set (8) | A | A | A |
| Example 14 Ink set (9) | A | A | A |
| Example 15 Ink set (10) | A | A | A |
| Example 16 Ink set (11) | A | A | A |
| Example 17 Ink set (12) | A | A | A |
| Comparative Example 4 | A | C | A |
| Comparative Example 5 | A | C | A |
| Comparative Example 6 | A | C | A |
| Comparative Example 7 | A | C | A |

EXAMPLES 18 to 23

First of all, the following respective components were mixed into solutions, and the resultant solutions were then filtered under pressure through a membrane filter (Fluoropore Filter, trade name: product of Sumitomo Electric Industries, Ltd.) having a port size of 0.22 μm, thereby obtaining sets of inks (13) through (18) of yellow, magenta, cyan and black colors.

(13)

| Yellow: | Methyl vinyl ether-maleic anhydride copolymer (Mw = 2,000) | 3 parts |
|---|---|---|
| | C.I. Direct Yellow 86 | 2 parts |
| | Ethylene oxide adduct of lauryl alcohol (number of moles added: 10) | 0.5 part |
| | Diethylene glycol | 30 parts |
| | Water | 64.5 parts |
| Magenta: | Methyl vinyl ether-maleic anhydride copolymer (Mw = 2,000) | 3 parts |
| | C.I. Acid Red 35 | 3 parts |
| | Ethylene oxide adduct of lauryl alcohol (number of moles added: 10) | 0.5 part |
| | Diethylene glycol | 30 parts |
| | Water | 63.5 parts |
| Cyan: | Methyl vinyl ether-maleic anhydride copolymer (Mw = 2,000) | 3 parts |
| | C.I. Direct Blue 199 | 2 parts |
| | Ethylene oxide adduct of lauryl alcohol (number of moles added: 10) | 0.5 part |
| | Diethylene glycol | 30 parts |
| | Water | 64.5 parts |
| Black: | Styrene-acrylic acid-acrylic ester copolymer (Mw = 10,000) | 2 parts |
| | Sodium hydroxide | 0.5 part |
| | C.I. Food Black 2 | 2 parts |
| | Diethylene glycol | 30 parts |
| | Water | 65.5 parts |

(14)

| Yellow: | Styrene-maleic acid copolymer (MW = 90,000) | 1 part |
|---|---|---|
| | Aqueous ammonia | 0.5 part |
| | C.I. Direct Yellow 86 | 2 parts |
| | Ethylene oxide adduct of nonyl-phenol (number of moles added: 18) | 5 parts |
| | Diethylene glycol | 30 parts |
| | Water | 60.5 parts |
| Magenta: | Styrene-maleic acid copolymer (Mw = 90,000) | 1 part |
| | Aqueous ammonia | 0.5 part |
| | C.I. Acid Red 35 | 3 parts |
| | Ethylene oxide adduct of nonyl-phenol (number of moles added: 18) | 5 parts |
| | Diethylene glycol | 30 parts |
| | Water | 60.5 parts |
| Cyan: | Styrene-maleic acid copolymer (Mw = 90,000) | 1 part |
| | Aqueous ammonia | 0.5 part |
| | C.I. Direct Blue 199 | 2 parts |
| | Ethylene oxide adduct of nonyl-phenol (number of moles added: 18) | 5 parts |
| | Diethylene glycol | 30 parts |
| | Water | 61.5 parts |
| Black: | Polyacrylic acid (Mw = 10,000) | 2 parts |
| | C.I. Food Black 2 | 2 parts |
| | Diethylene glycol | 30 parts |
| | Water | 66 parts |

(15)

| Yellow: | Styrene-maleic acid copolymer (Mw = 3,000) | 13 parts |
|---|---|---|
| | Sodium hydroxide | 0.2 part |
| | C.I. Direct Yellow 86 | 2 parts |
| | Ethylene oxide-propylene oxide copolymer (number of moles added: 7) | 3 parts |
| | Diethylene glycol | 30 parts |
| | Water | 51.8 parts |
| Magenta: | Styrene-maleic acid copolymer (Mw = 3,000) | 13 parts |
| | Sodium hydrbxide | 0.2 part |
| | C.I. Acid Red 35 | 3 parts |
| | Ethylene oxide-propylene oxide copolymer (number of moles added: 7) | 3 parts |
| | Diethylene glycol | 30 parts |
| | Water | 50.8 parts |
| Cyan: | Styrene-acrylic acid copolymer (Mw = 5,000) | 13 parts |
| | Sodium hydroxide | 0.5 part |
| | C.I. Direct Blue 199 | 2 parts |
| | Ethylene oxide-propylene oxide | 3 parts |

|  |  |  |
|---|---|---|
|  | copolymer (number of moles added: 7) |  |
|  | Diethylene glycol | 30 parts |
|  | Water | 51.5 parts |
| Black: | Methyl vinyl ether-monoethyl maleate copolymer (Mw = 10,000) | 2 parts |
|  | C.I. Food Black 2 | 2 parts |
|  | Diethylene glycol | 30 parts |
|  | Water | 66 parts |

(16)

|  |  |  |
|---|---|---|
| Yellow: | Pectinic acid | 2 parts |
|  | C.I. Direct Yellow 86 | 2 parts |
|  | Ethylene oxide adduct of acetylene glycol (number of moles added: 10) | 1 part |
|  | Diethylene glycol | 30 parts |
|  | Water | 65 parts |
| Magenta: | Methyl vinyl ether-maleic anhydride copolymer (Mw = 5,000) | 2 parts |
|  | C.I. Acid Red 35 | 3 parts |
|  | Ethylene oxide adduct of acetylene glycol (number of moles added: 10) | 1 part |
|  | Diethylene glycol | 30 parts |
|  | Water | 64 parts |
| Cyan: | Polyacrylic acid (Mw = 2,000) | 2 parts |
|  | C.I. Direct Blue 199 | 2 parts |
|  | Ethylene oxide adduct of acetylene glycol (number of moles added: 10) | 1 part |
|  | Diethylene glycol | 30 parts |
|  | Water | 65 parts |
| Black: | Isobutylene-maleic anhydride copolymer (Mw = 20,000) | 2 parts |
|  | Sodium hydroxide | 0.5 part |
|  | C.I. Food Black 2 | 2 parts |
|  | Diethylene glycol | 30 parts |
|  | Water | 65.5 parts |

(17)

|  |  |  |
|---|---|---|
| Yellow: | Styrene-acrylic acid copolymer (Mw = 10,000) | 2 parts |
|  | Sodium hydroxide | 0.3 part |
|  | C.I. Direct Yellow 86 | 2 parts |
|  | Decaglycerol monolaurate | 15 parts |
|  | Diethylene glycol | 30 parts |
|  | Water | 50.7 parts |
| Magenta: | Styrene-acrylic acid copolymer (Mw = 10,000) | 2 parts |
|  | Sodium hydroxide | 0.3 part |
|  | C.I. Acid Red 35 | 2 parts |
|  | Decaglycerol monolaurate | 15 parts |
|  | Diethylene glycol | 30 parts |
|  | Water | 50.7 parts |
| Cyan: | Styrene-acrylic acid copolymer (Mw = 10,000) | 2 parts |
|  | Sodium hydroxide | 0.3 part |
|  | C.I. Direct Blue 199 | 2 parts |
|  | Decaglycerol monolaurate | 15 parts |
|  | Diethylene glycol | 30 parts |
|  | Water | 50.7 parts |
| Black: | Polyitaconic acid (Mw = 50,000) | 2 parts |
|  | C.I. Food Black 2 | 2 parts |
|  | Diethylene glycol | 30 parts |
|  | Water | 66 parts |

(18)

|  |  |  |
|---|---|---|
| Yellow: | Styrene-acrylic acid copolymer (Mw = 10,000) | 2 parts |
|  | Sodium hydroxide | 0.3 part |
|  | C.I. Direct Yellow 86 | 2 parts |
|  | Sodium salt of lauryl sulfate | 0.2 part |
|  | Diethylene glycol | 30 parts |
|  | Water | 65.5 parts |
| Magenta: | Styrene-acrylic acid copolymer (Mw = 10,000) | 2 parts |
|  | Sodium hydroxide | 0.3 part |
|  | C.I. Acid Red 35 | 2 parts |
|  | Sodium salt of lauryl sulfate | 0.2 part |
|  | Diethylene glycol | 30 parts |
|  | Water | 65.5 parts |
| Cyan: | Styrene-acrylic acid copolymer (Mw = 10,000) | 2 parts |
|  | Sodium hydroxide | 0.3 part |
|  | C.I. Direct Blue 199 | 2 parts |
|  | Sodium salt of lauryl sulfate | 0.2 part |
|  | Diethylene glycol | 30 parts |
|  | Water | 65.5 parts |
| Black: | Polyitaconic acid (Mw = 50,000) | 2 parts |
|  | C.I. Food Black 2 | 2 parts |
|  | Diethylene glycol | 30 parts |
|  | Water | 66 parts |

The pHs of the above-described inks of the different colors were measured and adjusted with acetic acid or aqueous ammonia as shown in Table 4.

Using the thus-obtained ink sets (13) through (18), recording was then conducted on commercially-available paper for copying, or bond paper, thereby obtaining the results of Examples 18 to 23. As an ink-jet recording apparatus, was used a recording apparatus similar to that shown in FIG. 4, and color images were formed using 4 recording heads as illustrated in FIG. 9. Incidentally, the individual recording heads used were the same as that used in BJC 820 (trade name, ink-jet printer manufactured by Canon Inc.). The drive conditions of each of the recording heads, i.e., conditions for energizing a heater were as follows:

Voltage applied: 28 V
Pulse length: 3.2 μsec
Drive frequency: 5 kHz.

Comparative Example 8

Recording was conducted in the same manner as in Examples 18 to 23 except that inks in which the methyl vinyl ether-maleic anhydride copolymer or the styrene-acrylic acid-acrylic ester copolymer was omitted from the inks of their corresponding colors in (13) were used in an ink set.

Comparative Example 9

Recording was conducted in the same manner as in Examples 18 to 23 except that inks in which the methyl vinyl ether-maleic anhydride copolymer was omitted from the inks of their corresponding colors in (13) were used in an ink set.

Comparative Example 10

Recording was conducted in the same manner as in Examples 18 to 23 except that inks in which the styrene-acrylic acid-acrylic ester copolymer was omitted from the inks of their corresponding colors in (13) were used in an ink set.

Comparative Example 11:

Recording was conducted in the same manner as in Examples 11 to 17 except that inks in which the ethylene oxide adduct of lauryl alcohol was omitted from the inks of their corresponding colors in (13) were used in an ink set.

Comparative Example 12

Recording was conducted in the same manner as in Examples 18 to 23 except that inks in which the methyl vinyl ether-maleic anhydride copolymer or the styrene-acrylic acid-acrylic ester copolymer was omitted from the inks of their corresponding colors in (13) and with 0.5 part of ethylene oxide adduct of lauryl alcohol added to the black ink were used in an ink set.

The record densities, resistance to bleeding between the color inks and between the color ink and the black ink, and rub-off resistance of the records in Examples 18 to 23 and Comparative Examples 8 to 12 were evaluated in the same manner as in Examples 1 to 10. The results are shown in Table 5.

The quality of black-colored characters was also evaluated in accordance with the following standard. The results are shown in Table 5.

Quality of black-colored characters

English characters and numerals were recorded on commercially-available paper for copying, or bond paper. The resultant records were magnified through a microscope to observe the sharpness and resolution of the characters. The quality of black-colored characters was ranked in accordance with the following standard:

A: Edges of characters were sharp and resolution was good;

B: Feathering slightly occurred at edges of characters, which would cause no problem in actual use; and C: Resolution was poor, and feathering occurred, which would cause problems in actual use.

TABLE 4

| Ink set | pH level adjusted | | | |
|---|---|---|---|---|
| | Yellow | Magenta | Cyan | Black |
| (13) | 4.1 | 4.2 | 4.5 | 8.8 |
| (14) | 9.3 | 9.4 | 9.1 | 3.8 |
| (15) | 12.8 | 13.0 | 12.5 | 2.2 |
| (16) | 5.7 | 3.2 | 2.1 | 8.3 |
| (17) | 10.5 | 10.8 | 10.3 | 6.2 |
| (18) | 9.8 | 10.2 | 9.9 | 5.6 |

TABLE 5

| | Record density | Resistance to bleeding between color inks | Resistance to bleeding between color and black ink | Quality of black-colored character | Rub-off resistance |
|---|---|---|---|---|---|
| Ex. 18 Ink set (13) | A | A | A | A | A |
| Ex. 19 Ink set (14) | A | A | A | A | A |
| Ex. 20 Ink set (15) | A | A | A | A | A |
| Ex. 21 Ink set (16) | A | A | A | A | A |
| Ex. 22 Ink set (17) | A | A | A | A | A |
| Ex. 23 Ink set (18) | A | A | A | A | A |
| Comp. Ex. 8 | A | A | C | A | A |
| Comp. Ex. 9 | A | A | C | A | A |
| Comp. Ex. 10 | A | A | C | A | A |
| Comp. Ex. 11 | A | C | A | A | A |
| Comp. Ex. 12 | A | A | A | C | A |

As has been described above, the use of ink sets, ink-jet recording processes and recording apparatus according to the present invention permits the provision of high-quality color images on plain paper, said images being high in record density having and evenness of image density, good quality black-colored characters and free from any bleeding.

What is claimed is:

1. An ink set for ink-jet recording having a first, a second, a third and a fourth ink independently, each of the inks having a different color from each other, and being selected from the group consisting of a black ink and three color inks of yellow, magenta and cyan, wherein (1) the first ink contains a water-soluble resin having at least one carboxyl group or anhydride thereof, or sulfonic group in a molecule thereof, and the first ink's pH ($pH_1$) ranges from pH 1 to 6;

(2) the second ink's pH ($pH_2$) ranges from pH 4 to 8, and the second ink contains (a) a water-soluble resin having at least one carboxyl group or anhydride thereof, or sulfonic group in a molecule thereof, or (b) an alkali-soluble resin and an alkali;

(3) the third ink contains an alkali-soluble resin and an alkali, and the third ink's pH ($pH_3$) ranges from pH 6 to 10;

(4) the fourth ink contains an alkali-soluble resin and an alkali and the fourth ink's pH ($pH_4$) ranges from pH 8 to 13; and the pHs of the first, second, third and fourth inks satisfy the relationship of $pH_1 < pH_2 < pH_3 < pH_4$.

2. The ink set according to claim 1, wherein the water-soluble resin is a naturally-occurring or a synthetic water-soluble resin which has at least one carboxyl group or anhydride thereof, or sulfonic group in a molecule, or a mixture thereof.

3. The ink set according to claim 1, wherein the water-soluble resin is a polymer obtained by using, as a monomer, at least one of acrylic acid, methacrylic acid, itaconic acid, maleic acid and maleic anhydride, or a copolymer synthesized from at least one of said monomers and at least one of hydrophilic monomers having a hydrophilic group including a hydroxyl, amide, amino, ether, pyrrolidone or ethyleneimine group in a molecule.

4. The ink set according to claim 1, wherein the alkali-soluble resin is a copolymer of a hydrophilic monomer unit end a hydrophobic monomer.

5. The ink set according to claim 1, wherein the water-soluble resin has a weight average molecular weight of from 1,000 to 500,000.

6. The ink set according to claim 1, wherein the alkali-soluble resin has a weight average molecular weight of from 1,000 to 100,000.

* * * * *

UNITED STATES PATENT AND TRADEMARK OFFICE
CERTIFICATE OF CORRECTION

PATENT NO. : 5,990,227
DATED : November 23, 1999
INVENTOR(S) : YOSHIHISA TAKIZAWA, ET AL.

It is certified that error appears in the above-identified patent and that said Letters Patent is hereby corrected as shown below:

COLUMN 4:

Line 27, " "ph$_1$") " should read --"pH$_1$")--.

COLUMN 11:

Line 29, "is to" should read --is to be--.

COLUMN 21:

Line 59, "to applied" should read --to be applied--.

COLUMN 34:

Line 15, "having" should be deleted and "good" should read --having good--.

UNITED STATES PATENT AND TRADEMARK OFFICE
CERTIFICATE OF CORRECTION

PATENT NO. : 5,990,227

DATED : November 23, 1999

INVENTOR(S) : YOSHIHISA TAKIZAWA, ET AL.

Page 2 of 2

It is certified that error appears in the above-identified patent and that said Letters Patent is hereby corrected as shown below:

COLUMN 34:

Line 57, "end a" should read --and a-- and "monomer." should read --monomer unit.--.

Signed and Sealed this

Seventh Day of November, 2000

Attest:

Q. TODD DICKINSON

*Attesting Officer*  *Director of Patents and Trademarks*